US012380854B2

(12) United States Patent
Tanaka et al.

(10) Patent No.: US 12,380,854 B2
(45) Date of Patent: Aug. 5, 2025

(54) DISPLAY DEVICE AND METHOD FOR DRIVING SAME

(71) Applicant: Sharp Display Technology Corporation, Kameyama (JP)

(72) Inventors: Kohhei Tanaka, Kameyama (JP); Seiichi Uchida, Kameyama (JP)

(73) Assignee: SHARP DISPLAY TECHNOLOGY CORPORATION, Kameyama (JP)

(*) Notice: Subject to any disclaimer, the term of this patent is extended or adjusted under 35 U.S.C. 154(b) by 0 days.

(21) Appl. No.: 18/700,348

(22) PCT Filed: Dec. 29, 2021

(86) PCT No.: PCT/JP2021/049026
§ 371 (c)(1),
(2) Date: Apr. 11, 2024

(87) PCT Pub. No.: WO2023/127168
PCT Pub. Date: Jul. 6, 2023

(65) Prior Publication Data
US 2024/0412690 A1   Dec. 12, 2024

(51) Int. Cl.
*G09G 3/3233* (2016.01)
*G06F 3/041* (2006.01)
(Continued)

(52) U.S. Cl.
CPC ..... *G09G 3/3233* (2013.01); *G06F 3/041662* (2019.05); *G09G 3/3266* (2013.01);
(Continued)

(58) Field of Classification Search
None
See application file for complete search history.

(56) References Cited

U.S. PATENT DOCUMENTS 9,423,902 B2* 8/2016 Tan ............... G09G 3/325
9,459,721 B2* 10/2016 Tan ............... G06F 3/0412
(Continued)

FOREIGN PATENT DOCUMENTS

CN   110021270 A   7/2019
CN   112951153 A   6/2021
(Continued)

OTHER PUBLICATIONS

Official Communication issued in International Patent Application No. PCT/JP2021/049026, mailed on Mar. 15, 2022.

*Primary Examiner* — Nitin Patel
*Assistant Examiner* — Amen W Bogale
(74) *Attorney, Agent, or Firm* — Keating & Bennett, LLP

(57) ABSTRACT

A pixel circuit with sensing function that can perform sensing operation and display operation in a simultaneous and parallel manner is implemented using a small number of elements. For each pixel circuit (20) there are provided a sensor circuit (22) connected to a control node (NG) and including three or less circuit elements; and a read circuit (24) connected to a second conductive terminal of a drive transistor (T4) and including one read transistor (T9). A sensing process is performed during a period during which a drive current is supplied to an organic EL element (21) depending on a potential at the control node (NG). A sensing result reading process is performed by maintaining the read transistor (T9) in on state during a predetermined period after ending the sensing process.

17 Claims, 32 Drawing Sheets

(51) Int. Cl.
*G09G 3/3266* (2016.01)
*G09G 3/3275* (2016.01)

(52) U.S. Cl.
CPC ..... *G09G 3/3275* (2013.01); *G09G 2330/023* (2013.01); *G09G 2360/14* (2013.01)

(56) References Cited

U.S. PATENT DOCUMENTS

| | | |
|---|---|---|
| 2015/0103037 A1 | 4/2015 | Wu et al. |
| 2016/0132171 A1 | 5/2016 | Hu |
| 2017/0032728 A1 | 2/2017 | Shima et al. |
| 2019/0087626 A1* | 3/2019 | Wang ........................ H10F 77/20 |
| 2019/0355302 A1 | 11/2019 | Ding et al. |
| 2021/0134222 A1* | 5/2021 | Ding .................... G09G 3/3258 |
| 2021/0200413 A1* | 7/2021 | Jang .................... G06F 3/04182 |
| 2021/0335249 A1* | 10/2021 | Zhang .................. G06F 3/0412 |
| 2022/0012453 A1* | 1/2022 | Choi .................... H10K 59/131 |
| 2022/0199012 A1 | 6/2022 | Yamamoto et al. |
| 2023/0109516 A1* | 4/2023 | Saitoh ........................ G09F 9/30 |
| | | 257/40 |
| 2023/0120335 A1* | 4/2023 | Yuan .................... G09G 3/3233 |
| | | 345/55 |
| 2024/0013705 A1* | 1/2024 | Wang ........................ G09G 3/32 |

FOREIGN PATENT DOCUMENTS

| | | |
|---|---|---|
| JP | 2017-227854 A | 12/2017 |
| WO | 2020/202243 A1 | 10/2020 |

* cited by examiner

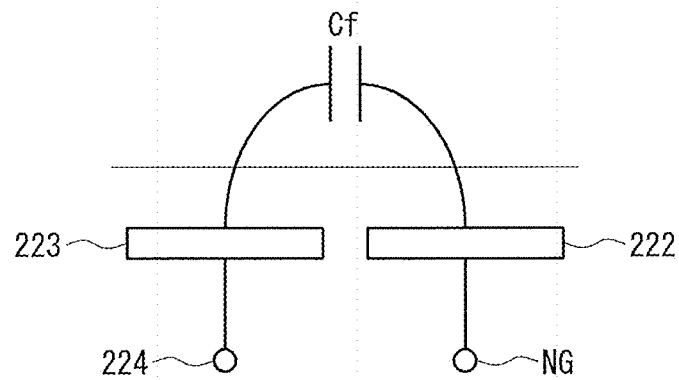
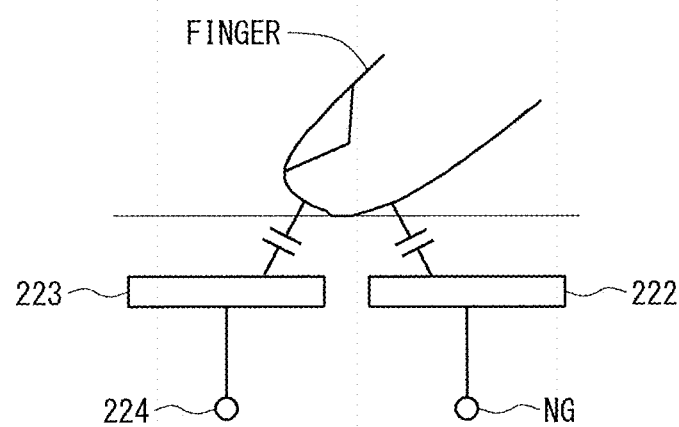

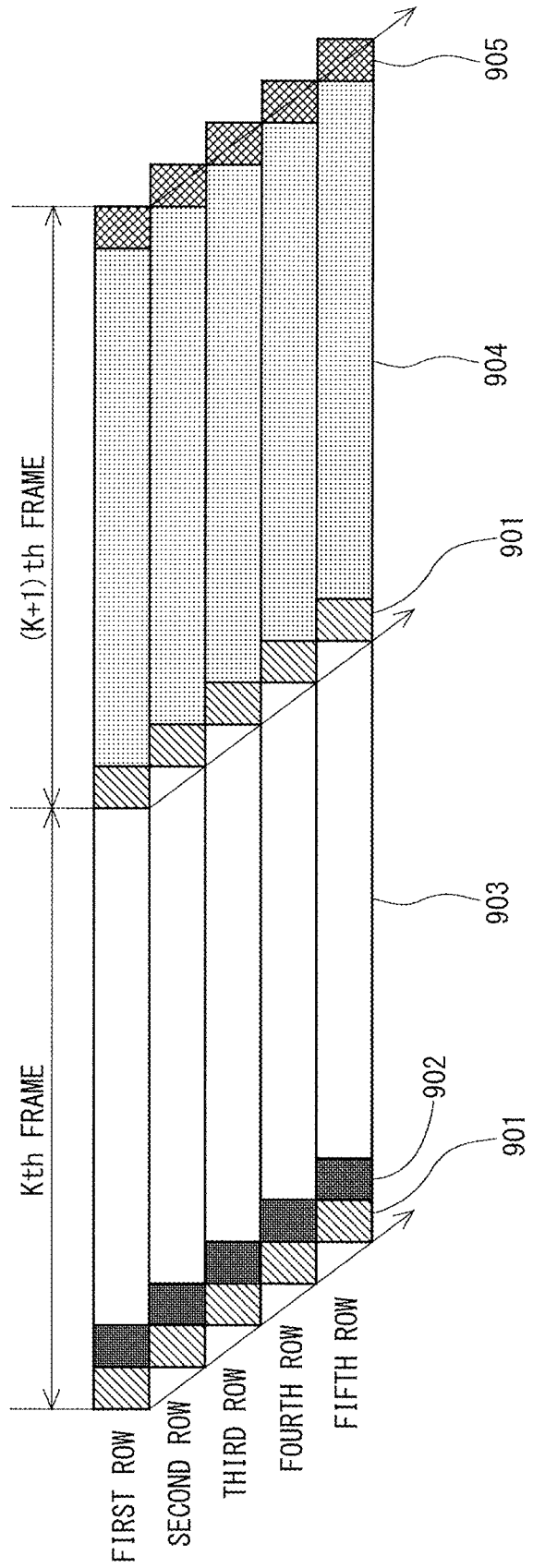

DISPLAY DEVICE AND METHOD FOR DRIVING SAME

TECHNICAL FIELD

The following disclosure relates to a display device in which circuits having sensing function such as photosensor circuits are provided in a display unit, and a method for driving the display device.

BACKGROUND ART

In recent years, an organic EL display device including pixel circuits each including an organic EL element has been put to practical use. The organic EL element is also called an organic light-emitting diode (OLED) and is a self-emissive display element that emits light at luminance depending on a current flowing therethrough. Since the organic EL element is thus a self-emissive display element, the organic EL display device can easily achieve slimming down, a reduction in power consumption, an increase in luminance, etc., compared to a liquid crystal display device that requires a backlight, a color filter, and the like. Thus, in recent years, development of organic EL display devices has been actively implemented.

There is an increasing need for provision of fingerprint detection function to an organic EL display device such as that described above. The fingerprint detection function can be implemented by, for example, providing a photosensor circuit for each pixel circuit. Note that in the following description, a pixel circuit formed integrally with a circuit having sensing function such as a photosensor circuit is referred to as "pixel circuit with sensing function".

An exemplary configuration of a pixel circuit with sensing function is shown in FIG. 31. FIG. 31 is a circuit diagram of a pixel circuit with sensing function which is disclosed in US 2019/0355302 A. The pixel circuit with sensing function includes ten transistors, one capacitor, and one photodiode in addition to an organic EL element. Simplification of the circuit is achieved by sharing two transistors (Md and M9) between a display drive circuit for image display and a detection circuit for sensing. Note that Japanese Laid-Open Patent Publication No. 2017-227854 also discloses an exemplary configuration of a pixel circuit with sensing function (a pixel unit including a pixel circuit and a light receiving circuit).

CITATION LIST

Patent Documents

[Patent Document 1] US 2019/0355302 A
[Patent Document 2] Japanese Laid-Open Patent Publication No. 2017-227854

SUMMARY

Problems to be Solved by the Invention

Meanwhile, regarding a pixel circuit of an organic EL display device, a thin-film transistor (TFT) is typically adopted as a drive transistor for controlling supply of a current to an organic EL element. However, the thin-film transistor is likely to cause variations in its characteristics. Specifically, variations are likely to occur in threshold voltage. If variations in threshold voltage occur in drive transistors provided in a display unit, then variations in luminance occur, degrading display quality. Hence, there is a need to perform a compensation process so as to compensate for variations in threshold voltage. For schemes for the compensation process, there are known an internal compensation scheme in which a compensation process is performed by providing, in a pixel circuit, a capacitor for holding information on a threshold voltage of a drive transistor, and an external compensation scheme in which a compensation process is performed by, for example, measuring, by a circuit provided external to a pixel circuit, the magnitude of a current flowing through a drive transistor under a predetermined condition, and correcting a data signal (video signal) based on a result of the measurement.

In recent years, as a pixel circuit of an organic EL display device that adopts the internal compensation scheme for a compensation process, there has been adopted a pixel circuit 910 having a configuration shown in FIG. 32. The pixel circuit 910 includes seven transistors T91 to T97 and one capacitor C91 in addition to an organic EL element 98. Further, as a general photosensor circuit, there is known a photosensor circuit 920 having a configuration shown in FIG. 33. The photosensor circuit 920 includes three transistors M91 to M93, one capacitor C92, and one photodiode 99. Thus, when sensing function is added to a pixel circuit that adopts the internal compensation scheme, a circuit including ten transistors, two capacitors, and one photodiode is required per pixel. Detecting a fingerprint requires a resolution of 500 dpi or higher. In addition, although an increase in the definition of a display device has been implemented in recent years, it becomes difficult to achieve an increase in definition when such a configuration that uses a large number of circuit elements is adopted.

In addition, according to the configuration shown in FIG. 31, display operation (operation of allowing the organic EL elements to emit light at desired luminance for image display) and sensing operation (operation of detecting light to determine the intensity of the light) cannot be performed in a simultaneous and parallel manner, and a desired image cannot be displayed during sensing operation, which will be described below.

FIG. 34 is a diagram for describing operation performed during two consecutive frame periods in the configuration shown in FIG. 31. In FIG. 34, a portion given reference character 901 represents a period during which initialization of the circuit is performed, a portion given reference character 902 represents a period during which writing of a data signal for image display is performed, a portion given reference character 903 represents a period during which light emission of the organic EL element (desired image display) is performed, a portion given reference character 904 represents a period during which storing of charge depending on the amount of received light and white display are performed, and a portion given reference character 905 represents a period during which reading of a current depending on the amount of received light is performed. As such, a Kth frame is a frame period for display operation and a (K+1)th frame is a frame period for sensing operation. In the Kth frame, sensing operation is not performed, and in the (K+1)th frame, Vint1 is controlled such that the organic EL element goes into turn-off state or a state of being a light source. Further, after starting the (K+1)th frame, display data is cleared by initialization. Accordingly, in the (K+1)th frame, a desired image is not displayed, and a white solid image is displayed. As such, display operation and sensing operation cannot be performed in a simultaneous and parallel manner.

Hence, an object of the following disclosure is to implement a pixel circuit with sensing function that can perform sensing operation and display operation in a simultaneous and parallel manner, using a small number of elements.

Means for Solving the Problems

A display device according to some embodiments of the present disclosure is a display device that uses a display element driven by a current, the display device including: a plurality of data signal lines each configured to transmit a data signal;
  a plurality of scanning signal lines that intersect the plurality of data signal lines;
  a plurality of light-emission control lines that intersect the plurality of data signal lines;
  a plurality of pixel circuits each including the display element and provided so as to correspond to one of the plurality of data signal lines, at least one of the plurality of scanning signal lines, and one of the plurality of light-emission control lines;
  a first power line to which a first power supply potential is provided;
  a second power line to which a second power supply potential is provided;
  an initialization power line to which an initialization potential is provided; and
  a data conversion circuit including an AD converter, wherein
each of the plurality of pixel circuits includes:
  the display element provided between the first power line and the second power line and having a first terminal on a first power line side; and a second terminal on a second power line side;
  a control node;
  a drive transistor provided in series with the display element and having a control terminal connected to the control node; a first conductive terminal on a first power line side; and a second conductive terminal on a second power line side;
  a first initialization transistor having a control terminal; a first conductive terminal connected to the control node; and a second conductive terminal connected to the initialization power line; and
  a holding capacitor having one terminal connected to the control node,
for each of at least some of the plurality of pixel circuits, there are provided:
  a sensor circuit connected to the control node, including three or less circuit elements, and configured to perform a sensing process; and
  a read transistor having a control terminal; a first conductive terminal connected to the second conductive terminal of the drive transistor; and a second conductive terminal connected to the data conversion circuit,
the sensing process is performed during a period during which a drive current is supplied to the display element depending on a potential at the control node, and
a sensing result reading process in which an analog value obtained based on a result of the sensing process is read to the data conversion circuit is performed by maintaining the read transistor in on state during a predetermined period after ending the sensing process.

A driving method (for a display device) according to some embodiments of the present disclosure is a method for driving a display device that uses a display element driven by a current, wherein
the display device includes:
  a plurality of pixel circuits each including the display element;
  a first power line to which a first power supply potential is provided;
  a second power line to which a second power supply potential is provided;
  an initialization power line to which an initialization potential is provided; and
  a data conversion circuit including an AD converter,
each of the plurality of pixel circuits includes:
  the display element provided between the first power line and the second power line and having a first terminal on a first power line side; and a second terminal on a second power line side;
  a control node;
  a drive transistor provided in series with the display element and having a control terminal connected to the control node; a first conductive terminal on a first power line side; and a second conductive terminal on a second power line side;
  a first initialization transistor having a control terminal; a first conductive terminal connected to the control node; and a second conductive terminal connected to the initialization power line; and
  a holding capacitor having one terminal connected to the control node,
in the display device, for each of at least some of the plurality of pixel circuits, there are provided:
  a sensor circuit connected to the control node, including three or less circuit elements, and configured to perform a sensing process; and
  a read transistor having a control terminal; a first conductive terminal connected to the second conductive terminal of the drive transistor; and a second conductive terminal connected to the data conversion circuit, and
for each of the at least some of the plurality of pixel circuits, the method including:
  an initializing step of maintaining the first initialization transistor in on state to initialize a potential at the control node and a state of the sensor circuit;
  a data writing step of providing a data signal to the control node;
  a displaying step of performing supply of a drive current depending on the potential at the control node to the display element and the sensing process in a parallel manner; and
  a sensing result reading step of maintaining the read transistor in on state to read a result of the sensing process.

Effects of the Invention

According to several embodiments of the present disclosure, in order for a pixel circuit to have sensing function, a sensor circuit including three or less circuit elements and one read transistor are added to the pixel circuit. A sensing process by the sensor circuit is performed during a period during which a drive current is supplied to a display element, and thereafter, the read transistor is brought into on state, by which a sensing result is read. As such, a pixel circuit with sensing function that can perform sensing operation and display operation in a simultaneous and parallel manner is implemented using a small number of elements.

BRIEF DESCRIPTION OF THE DRAWINGS

FIG. 21 is a diagram for describing a case in which mutual capacitance is large in the eighth embodiment.

FIG. 22 is a diagram for describing a case in which mutual capacitance is small in the eighth embodiment.

FIG. 34 is a diagram for describing operation performed during two consecutive frame periods in a configuration shown in FIG. 31.

MODES FOR CARRYING OUT THE INVENTION

With reference to the accompanying drawings, embodiments will be described below. Note that in the following description, it is assumed that i and j are integers greater than or equal to 2, n is an integer between 1 and i, inclusive, and m is an integer between 1 and j, inclusive.

<0. Configuration Common to all Embodiments>

Before describing each embodiment in detail, matters that are common to all embodiments will be described.

<0.1 Overall Configuration>

Figure 2:
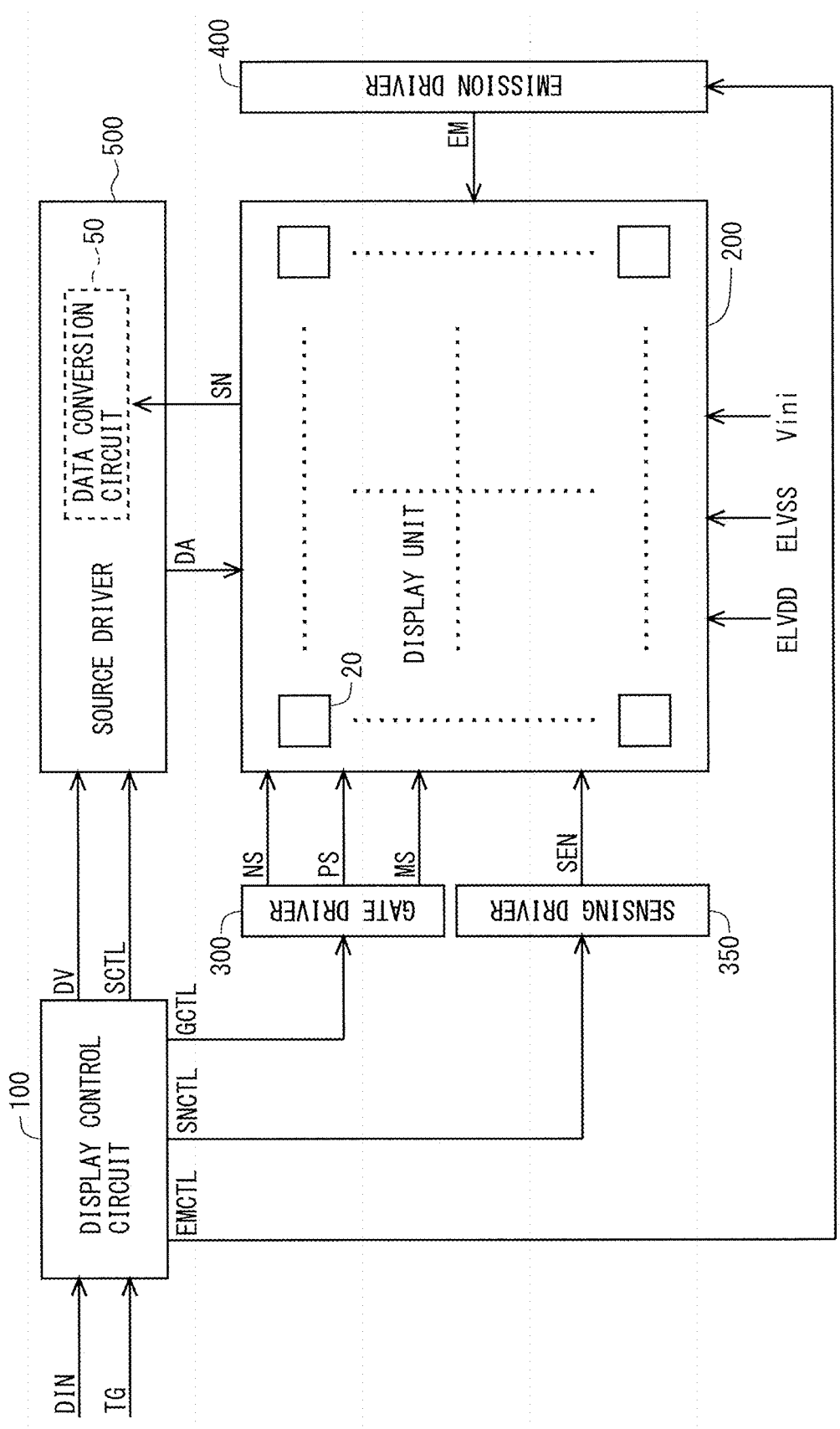
FIG. 2 is a block diagram showing an overall configuration of an organic EL display device in all embodiments.

FIG. 2 is a block diagram showing an overall configuration of an organic EL display device in all embodiments. As shown in FIG. 2, the organic EL display device includes a display control circuit 100, a display unit 200, a gate driver (scanning signal line drive circuit) 300, a sensing driver (sensing control line drive circuit) 350, an emission driver (light-emission control line drive circuit) 400, and a source driver (data signal line drive circuit) 500. The source driver 500 includes a data conversion circuit 50.

Figure 3:
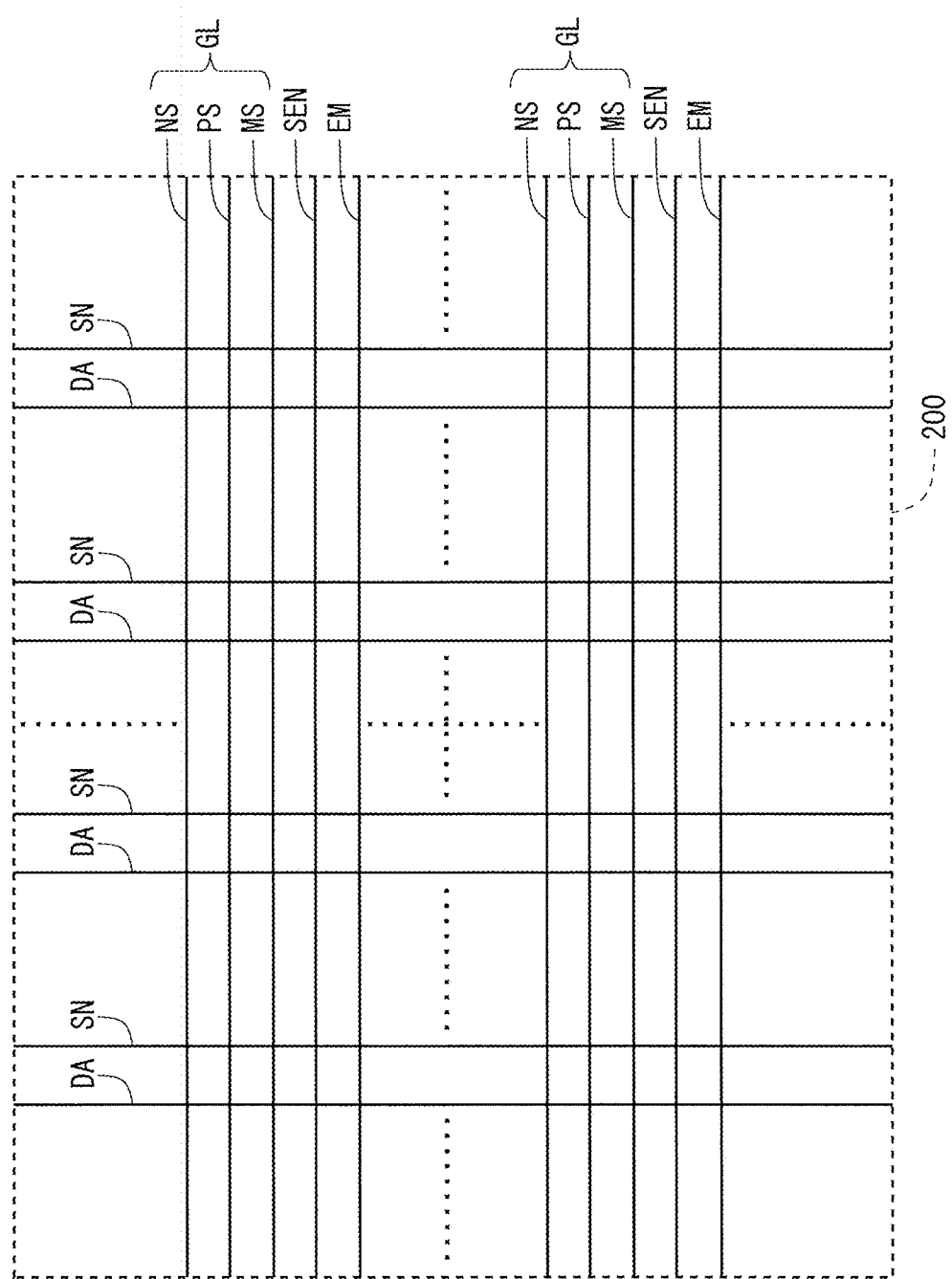
FIG. 3 is a diagram for describing wiring lines in a display unit in all embodiments.

As shown in FIG. 3, in the display unit 200 there are disposed a plurality of scanning signal lines GL, a plurality of sensing control lines SEN, a plurality of light-emission control lines EM, a plurality of data signal lines DA, and a plurality of detection data lines SN. The scanning signal lines GL, the sensing control lines SEN, and the light-emission control lines EM are typically parallel to each other. The data signal lines DA and the detection data lines SN are typically parallel to each other. The data signal lines DA and the detection data lines SN intersect the scanning signal lines GL, the sensing control lines SEN, and the light-emission control lines EM. Meanwhile, in this embodiment, as the plurality of scanning signal lines GL, three types of scanning signal lines are disposed in the display unit 200. That is, in the display unit 200 there are disposed, as the plurality of scanning signal lines GL, a plurality of first scanning signal lines NS, a plurality of second scanning signal lines PS, and a plurality of third scanning signal lines MS. The first scanning signal lines NS each allow a first scanning signal to be transmitted therethrough, the second scanning signal lines PS each allow a second scanning signal to be transmitted therethrough, the third scanning signal lines MS each allow a third scanning signal to be transmitted therethrough, the sensing control lines SEN each allow a sensing control signal to be transmitted therethrough, the light-emission control lines EM each allow alight-emission control signal to be transmitted therethrough, the data signal lines DA each allow a data signal to be transmitted therethrough, and the detection data lines SN each allow detection data to be transmitted therethrough. In the following description, when necessary, the first scanning signal is also given reference character NS, the second scanning signal is also given reference character PS, the third scanning signal is also given reference character MS, the sensing control signal is also given reference character SEN, the light-emission control signal is also given reference character EM, and the detection data is also given reference character SN.

In addition, in the display unit 200 there are provided a plurality of pixel circuits 20. Here, it is assumed that the plurality of pixel circuits 20 are i×j pixel circuits 20. The i×j pixel circuits 20 form a pixel matrix of i rows×j columns. Note that a sensor circuit and a read circuit (not shown in FIG. 2) which are described below are provided near each pixel circuit 20, and a pixel circuit with sensing function is implemented by the pixel circuit 20, the sensor circuit, and the read circuit.

Furthermore, in the display unit 200 there are disposed power lines (not shown) which are shared between the pixel circuits 20. More specifically, there are disposed a power line that supplies a high-level power supply potential ELVDD for driving organic EL elements (hereinafter, referred to as "high-level power line"), a power line that supplies a low-level power supply potential ELVSS for driving the organic EL elements (hereinafter, referred to as "low-level power line"), and a power line that supplies an initialization potential Vini (hereinafter, referred to as "initialization power line"). The initialization potential Vini is a potential lower than the high-level power supply potential ELVDD. The high-level power supply potential ELVDD, the low-level power supply potential ELVSS, and the initialization potential Vini are supplied from a power supply circuit which is not shown. Note that the high-level power supply potential ELVDD corresponds to a first power supply potential and the low-level power supply potential ELVSS corresponds to a second power supply potential. Note also that the high-level power line corresponds to a first power line and the low-level power line corresponds to a second power line.

Operation of each component shown in FIG. 2 will be described below. The display control circuit 100 receives an input image signal DIN and a timing signal group (a horizontal synchronizing signal, a vertical synchronizing signal, etc.) TG which are sent from an external source, and outputs digital video signals DV, gate control signals GCTL that control operation of the gate driver 300, sensing driver control signals SNCTL that control operation of the sensing driver 350, emission driver control signals EMCTL that control operation of the emission driver 400, and source control signals SCTL that control operation of the source driver 500. The gate control signals GCTL, the sensing driver control signals SNCTL, and the emission driver control signals EMCTL include a start pulse signal, a clock signal, etc. The source control signals SCTL include a source start pulse signal, a source clock signal, a latch strobe signal, etc.

The gate driver 300 is connected to the plurality of scanning signal lines (the plurality of first scanning signal lines NS, the plurality of second scanning signal lines PS, and the plurality of third scanning signal lines MS). The gate driver 300 applies scanning signals to the plurality of scanning signal lines GL, based on the gate control signals GCTL outputted from the display control circuit 100. Specifically, the gate driver 300 applies first scanning signals, second scanning signals, and third scanning signals to the plurality of first scanning signal lines NS, the plurality of second scanning signal lines PS, and the plurality of third scanning signal lines MS, respectively, based on the gate control signals GCTL outputted from the display control circuit 100.

The sensing driver 350 is connected to the plurality of sensing control lines SEN. The sensing driver 350 applies sensing control signals to the plurality of sensing control lines SEN, based on the sensing driver control signals SNCTL outputted from the display control circuit 100.

The emission driver 400 is connected to the plurality of light-emission control lines EM. The emission driver 400 applies light-emission control signals to the plurality of light-emission control lines EM, based on the emission driver control signals EMCTL outputted from the display control circuit 100.

The source driver 500 includes a j-bit shift register, a sampling circuit, a latch circuit, j D/A converters, and the like, which are not shown. The shift register has j cascade-connected registers. The shift register sequentially transfers a pulse of the source start pulse signal supplied to a register at an initial stage, from an input terminal to an output terminal, based on the source clock signal. In response to the transfer of the pulse, a sampling pulse is outputted from each stage of the shift register. Based on the sampling pulse, the sampling circuit stores digital video signals DV. The latch circuit captures and holds digital video signals DV for one row that are stored in the sampling circuit, in accordance with the latch strobe signal. The D/A converters are provided so as to correspond to the respective data signal lines DA. The D/A converters convert the digital video signals DV held in the latch circuit into analog voltages. The converted analog voltages are simultaneously applied, as data signals, to all data signal lines DA.

In addition, the data conversion circuit 50 in the source driver 500 receives, through the read circuit and the detection data line SN, detection data which is analog data obtained by the sensor circuit performing sensing operation, and performs AD conversion on the detection data. Digital sensing data which is data obtained by the AD conversion is sent to, for example, a host (not shown) and used for a process for fingerprint detection.

In this manner, by applying the data signals to the plurality of data signal lines DA, applying the scanning signals to the plurality of scanning signal lines GL, applying the sensing control signals to the plurality of sensing control lines SEN, and applying the light-emission control signals to the plurality of light-emission control lines EM, an image based on the input image signal DIN is displayed on the display unit 200 and detection of a fingerprint is performed based on the detection data obtained by performing sensing operation.

<0.2 Configuration of a Pixel Circuit with Sensing Function>

Figure 4:
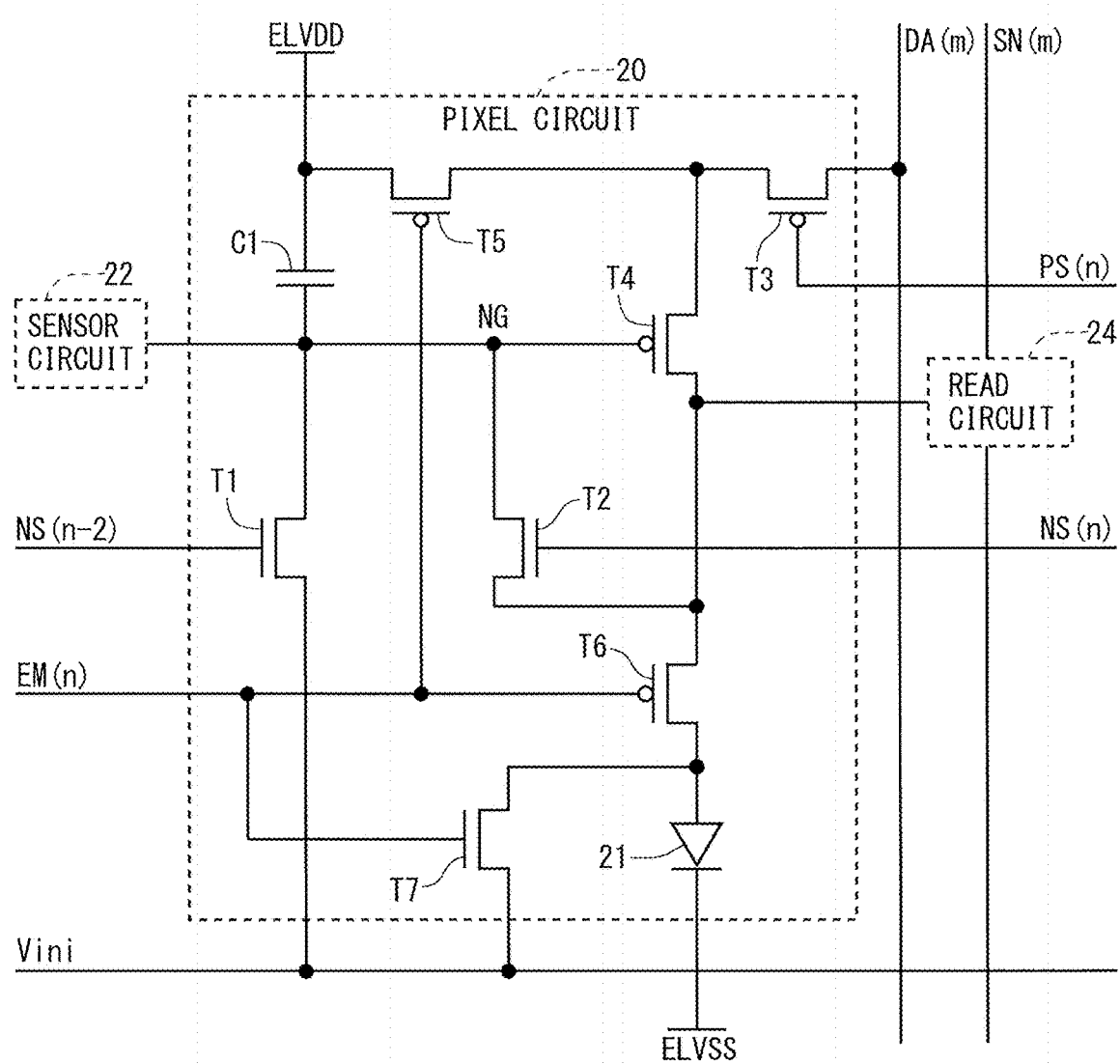
FIG. 4 is a circuit diagram showing a configuration of a pixel circuit with sensing function in all embodiments.

FIG. 4 is a circuit diagram showing a configuration of a pixel circuit with sensing function in all embodiments. As shown in FIG. 4, the pixel circuit with sensing function includes pixel circuit 20, a sensor circuit 22, and a read circuit 24. Note that the pixel circuit 20 shown in FIG. 4 is a pixel circuit 20 in an nth row and an mth column.

As shown in FIG. 4, the pixel circuit 20 includes one organic EL element (organic light-emitting diode) 21 serving as a display element; seven transistors (a first initialization transistor T1, a threshold voltage compensation transistor T2, a write control transistor T3, a drive transistor T4, a power supply control transistor T5, a light-emission control transistor T6, and a second initialization transistor T7); and one holding capacitor C1.

The first initialization transistor T1, the threshold voltage compensation transistor T2, and the second initialization transistor T7 are N-channel transistors and are typically IGZO-TFTs (thin-film transistors having a channel layer made of an oxide semiconductor containing indium, gallium, zinc, and oxygen). The write control transistor T3, the drive transistor T4, the power supply control transistor T5, and the light-emission control transistor T6 are P-channel transistors and are typically LTPS-TFTs (thin-film transistors having a channel layer made of low-temperature polysilicon). Note, however, that the configuration is not limited thereto and, for example, all transistors T1 to T7 can also be formed using LTPS-TFTs.

The first initialization transistor T1 is connected at its control terminal to a first scanning signal line NS(n−2), connected at its first conductive terminal to a control node NG, and connected at its second conductive terminal to an initialization power line. The threshold voltage compensation transistor T2 is connected at its control terminal to a first scanning signal line NS(n), connected at its first conductive terminal to a second conductive terminal of the drive transistor T4 and a first conductive terminal of the light-emission control transistor T6, and connected at its second conductive terminal to the control node NG. The write control transistor T3 is connected at its control terminal to a second scanning signal line PS(n), connected at its first conductive terminal to a data signal line DA(m), and connected at its second conductive terminal to a first conductive terminal of the drive transistor T4 and a second conductive terminal of the power supply control transistor T5. The drive transistor T4 is connected at its control terminal to the control node NG, connected at its first conductive terminal to the second conductive terminal of the write control transistor T3 and the second conductive terminal of the power supply control transistor T5, and connected at its second conductive terminal to the first conductive terminal of the threshold voltage compensation transistor T2 and the first conductive terminal of the light-emission control transistor T6.

The power supply control transistor T5 is connected at its control terminal to a light-emission control line EM(n), connected at its first conductive terminal to a high-level power line, and connected at its second conductive terminal to the second conductive terminal of the write control transistor T3 and the first conductive terminal of the drive transistor T4. The light-emission control transistor T6 is connected at its control terminal to the light-emission control line EM(n), connected at its first conductive terminal to the first conductive terminal of the threshold voltage compensation transistor T2 and the second conductive terminal of the drive transistor T4, and connected at its second conductive terminal to a first conductive terminal of the second initialization transistor T7 and an anode terminal (first terminal) of the organic EL element 21. The second initialization transistor T7 is connected at its control terminal to the light-emission control line EM(n), connected at its first conductive terminal to the second conductive terminal of the light-emission control transistor T6 and the anode terminal of the organic EL element 21, and connected at its second conductive terminal to the initialization power line. The holding capacitor C1 is connected at its first electrode to the control node NG and connected at its second electrode to the high-level power line. The organic EL element 21 is connected at its anode terminal to the second conductive terminal of the light-emission control transistor T6 and the first conductive terminal of the second initialization transistor T7 and connected at its cathode terminal (second terminal) to a low-level power line.

The sensor circuit 22 performs a sensing process. The sensing process will be described in detail later. In first to sixth embodiments, the sensor circuit 22 detects the intensity of radiated light (i.e., the sensor circuit 22 in the first to sixth embodiments is a photosensor circuit), and in a seventh embodiment, the sensor circuit 22 detects self-capacitance formed between an electrode and a finger. The sensor circuit 22 is connected to the control node NG and includes three or less circuit elements. A detailed configuration of the sensor circuit 22 varies between the embodiments and thus will be described later.

The read circuit 24 is connected to the second conductive terminal of the drive transistor T4 and a detection data line SN(m). The detection data line SN(m) is connected to the data conversion circuit 50 in the source driver 500. That is, the read circuit 24 is connected to the data conversion circuit 50 through the detection data line SN(m). The read circuit 24 reads analog data (analog value) generated depending on a result of a sensing process to the data conversion circuit 50. Specifically, a current having a magnitude (current value) depending on a result of a sensing process flows between the first conductive terminal of the drive transistor T4 and second conductive terminal thereof, and is supplied by the read circuit 24 to the data conversion circuit 50 through the detection data line SN(m). A process of reading a current having a magnitude depending on a result of a sensing process to the data conversion circuit 50 (a process performed by the read circuit 24) is hereinafter referred to as "sensing result reading process" for the sake of convenience. Note that though not particularly limited, in the following embodiments, it is assumed that a sensing result reading process is performed by a read circuit 24 provided for each pixel circuit 20 during each frame period.

<0.3 Configuration of the Data Conversion Circuit>

Figure 5:
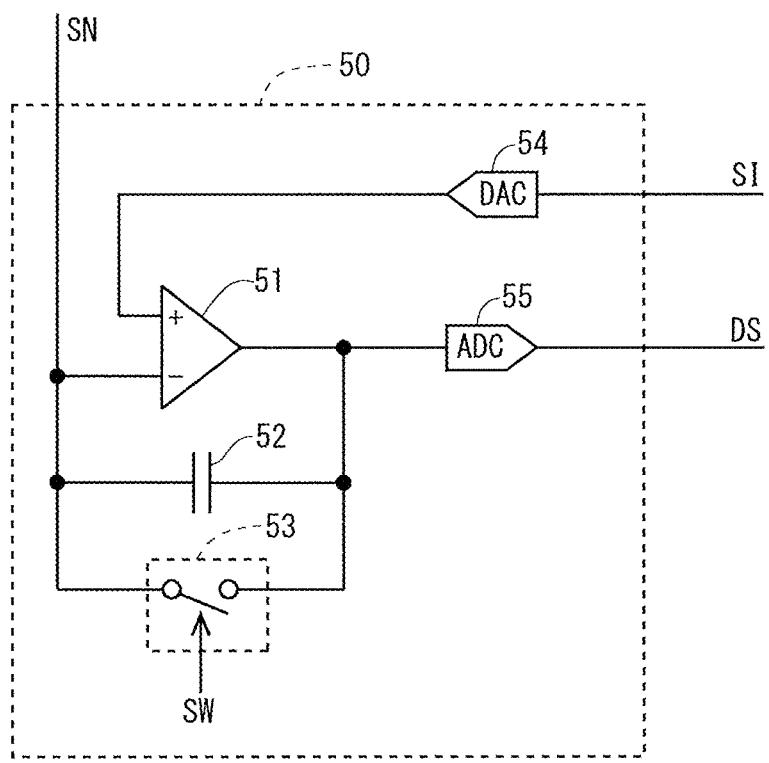
FIG. 5 is a circuit diagram showing a configuration of a data conversion circuit in a source driver in all embodiments.

FIG. 5 is a circuit diagram showing a configuration of the data conversion circuit 50 in the source driver 500. Note that the configuration shown here is an example and is not limited thereto. As shown in FIG. 5, the data conversion circuit 50 includes an operational amplifier 51, a capacitor 52, a switch 53, a DA converter (DAC) 54, and an AD converter (ADC) 55.

An initialization signal SI is provided to an input terminal of the DA converter 54. The DA converter 54 converts the initialization signal SI which is a digital signal into an analog voltage. An output terminal of the DA converter 54 is connected to a non-inverting input terminal of the operational amplifier 51. An inverting input terminal of the operational amplifier 51 is connected to a detection data line SN. The switch 53 is provided between the inverting input terminal of the operational amplifier 51 and output terminal thereof. The capacitor 52 is provided in parallel to the switch 53 and between the inverting input terminal of the operational amplifier 51 and output terminal thereof. A switch control signal SW included in source control signals SCTL is provided to a control terminal of the switch 53. The output terminal of the operational amplifier 51 is connected to an input terminal of the AD converter 55.

In a configuration such as that described above, when the switch 53 is brought into on state by the switch control signal SW, a short-circuit state occurs between the inverting input terminal of the operational amplifier 51 and output terminal thereof. In this case, the operational amplifier 51 functions as a buffer amplifier. By this, a voltage provided to the non-inverting input terminal of the operational amplifier 51 is applied to the detection data line SN. That is, an analog voltage based on the initialization signal SI is applied to the detection data line SN. When the switch 53 is brought into off state by the switch control signal SW, the inverting input terminal of the operational amplifier 51 and output terminal thereof are connected to each other through the capacitor 52. In this case, the operational amplifier 51 and the capacitor 52 function as an integrator circuit. By this, an output voltage of the operational amplifier 51 is a voltage depending on a current flowing through the detection data line SN. The AD converter 55 performs AD conversion on the output voltage of the operational amplifier 51. Digital sensing data DS obtained by performing the AD conversion is, as described above, sent to, for example, a host and used for a process for fingerprint detection.

1. First Embodiment

<1.1 Configuration of a Pixel Circuit with Sensing Function>

Figure 1:
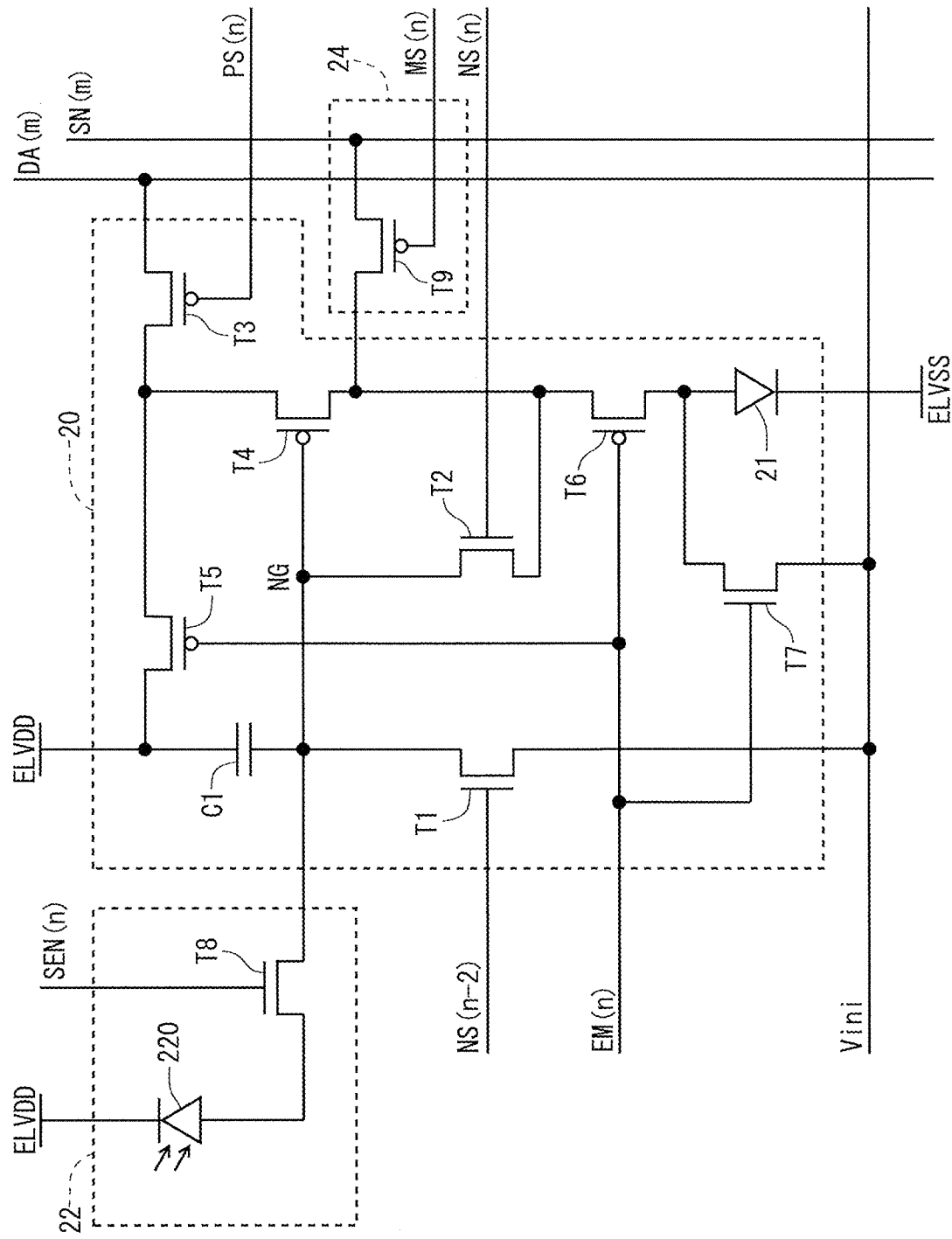
FIG. 1 is a circuit diagram showing a configuration of a pixel circuit with sensing function in a first embodiment.

FIG. 1 is a circuit diagram showing a configuration of a pixel circuit with sensing function in the first embodiment. A configuration of a pixel circuit 20 is as described above with reference to FIG. 4 as a configuration common to all embodiments.

As shown in FIG. 1, a sensor circuit 22 includes a photodiode 220 and a sensing control transistor T8. The photodiode 220 is connected at its anode terminal to a first conductive terminal of the sensing control transistor T8 and connected at its cathode terminal to the high-level power line. By this, a reverse-bias voltage is applied to the photodiode 220. The sensing control transistor T8 is, for example, an N-channel IGZO-TFT. The sensing control transistor T8 is connected at its control terminal to a sensing control line SEN (n), connected at its first conductive terminal to the anode terminal of the photodiode 220, and connected at its second conductive terminal to the control node NG. By a configuration such as that described above, during a period during which the sensing control transistor T8 is maintained in on state, a photocurrent generated depending on the intensity of light entering the photodiode 220 flows from the high-level power line to the control node NG through the photodiode 220 and the sensing control transistor T8.

Note that for the photodiode 220, an a-Si photodiode, an LTPS photodiode, an organic photodiode (OPD), a photodiode made of a quantum dot LED (QLED), a photodiode made of a microLED (μLED), etc., can be adopted.

As shown in FIG. 1, a read circuit 24 is constituted by a read transistor T9. The read transistor T9 is, for example, a P-channel LTPS-TFT. The read transistor T9 is connected at its control terminal to a third scanning signal line MS(n), connected at its first conductive terminal to the second conductive terminal of the drive transistor T4, and connected at its second conductive terminal to the detection data line SN (m). By maintaining the read transistor T9 in on state after ending a sensing process by the sensor circuit 22, the aforementioned sensing result reading process is performed. Note that a configuration of a read circuit 24 in the second to seventh embodiments which will be described later is the same as that of the read circuit 24 in the present embodiment.

Meanwhile, upon writing a data signal DA(m) to the pixel circuit 20, charge is stored in the holding capacitor C1 depending on the magnitude of a voltage serving as the data signal DA(m). In addition, when a sensing process by the sensor circuit 22 is performed, charge is stored in the holding capacitor C1 based on a photocurrent generated by light entering the photodiode 220. As such, the holding capacitor C1 is shared between a circuit for display operation and a circuit for sensing operation.

<1.2 Operation of the Pixel Circuit with Sensing Function>

Figure 6:
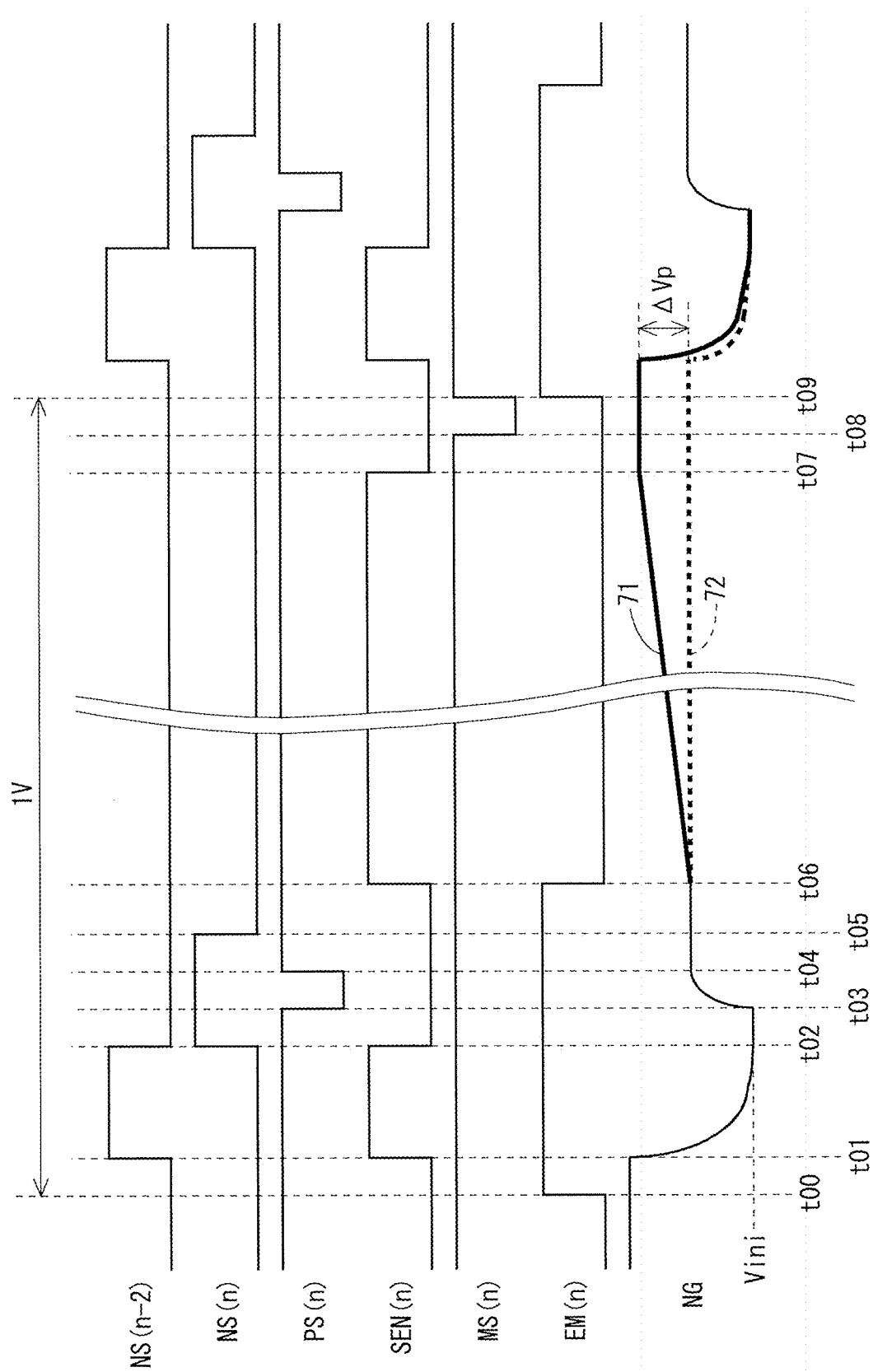
FIG. 6 is a waveform diagram for describing operation of the pixel circuit with sensing function in the first embodiment.

With reference to FIG. 6, operation of the pixel circuit with sensing function shown in FIG. 1 will be described. At a point in time immediately before time t00, a first scanning signal NS(n−2) is at low level, a first scanning signal NS(n) is at low level, a second scanning signal PS(n) is at high level, a sensing control signal SEN(n) is at low level, a third scanning signal MS(n) is at high level, and a light-emission control signal EM(n) is at low level. At this time, the power supply control transistor T5 and the light-emission control transistor T6 are in on state, and a drive current depending on a potential at the control node NG is supplied to the organic EL element 21. Thus, the organic EL element 21 emits light depending on the magnitude of the drive current.

At time t00, the light-emission control signal EM(n) changes from low level to high level. By this, the power supply control transistor T5 and the light-emission control transistor T6 go into off state. As a result, the supply of the current to the organic EL element 21 is interrupted and the organic EL element 21 goes into turn-off state. In addition, by the second initialization transistor T7 going into on state, the anode potential of the organic EL element 21 is initialized based on an initialization potential Vini.

At time t01, the first scanning signal NS(n−2) changes from low level to high level, by which the first initialization transistor T1 goes into on state. By this, the potential at the control node NG is initialized based on the initialization potential Vini. In addition, at time t01, the sensing control signal SEN(n) changes from low level to high level, by which the sensing control transistor T8 goes into on state. At this time, since the first initialization transistor T1 is also in on state, the anode potential of the photodiode 220 is initialized based on the initialization potential Vini.

At time t02, the first scanning signal NS(n−2) and the sensing control signal SEN(n) change from high level to low level. By this, the first initialization transistor T1 and the sensing control transistor T8 go into off state. In addition, at time t02, the first scanning signal NS(n) changes from low level to high level, by which the threshold voltage compensation transistor T2 goes into on state.

At time t03, the second scanning signal PS(n) changes from high level to low level, by which the write control transistor T3 goes into on state. By this, a data signal DA(m) is provided to the control node NG through the write control transistor T3, the drive transistor T4, and the threshold voltage compensation transistor T2. That is, writing of the data signal DA(m) to the pixel circuit 20 is performed. At time t04, the second scanning signal PS(n) changes from low level to high level, by which the write control transistor T3 goes into off state. At time t05, the first scanning signal NS(n) changes from high level to low level, by which the threshold voltage compensation transistor T2 goes into off state.

At time t06, the light-emission control signal EM(n) changes from high level to low level, by which the power supply control transistor T5 and the light-emission control transistor T6 go into on state. By this, a drive current depending on the potential at the control node NG is supplied to the organic EL element 21, and the organic EL element 21 emits light depending on the magnitude of the drive current. In addition, at time t06, the sensing control signal SEN(n) changes from low level to high level, by which the sensing control transistor T8 goes into on state. By this, a current (photocurrent) depending on the intensity of light entering the photodiode 220 (i.e., outside light) flows from the high-level power line to the control node NG through the photodiode 220 and the sensing control transistor T8. By this, during a period from time t06 to time t07, the potential at the control node NG increases depending on the intensity of the outside light. Note that in FIG. 6, a bold-solid-line waveform given reference character 71 represents the waveform of the potential at the control node NG in a pixel irradiated with light, and a bold-dotted-line waveform given reference character 72 represents the waveform of the potential at the control node NG in a pixel not irradiated with light (the same also applies to FIGS. 9, 11, 13, 15, 17, and 19).

At time t07, the sensing control signal SEN(n) changes from high level to low level, by which the sensing control transistor T8 goes into off state. By this, the increase in potential at the control node NG stops.

At time t08, the third scanning signal MS (n) changes from high level to low level, by which the read transistor T9 goes into on state. At this time, since the power supply control transistor T5 is in on state, a current depending on the potential at the control node NG flows from the high-level power line to the detection data line SN (m) through the power supply control transistor T5, the drive transistor T4, and the read transistor T9. Then, the data conversion circuit 50 performs AD conversion based on the current, by which digital sensing data DS depending on a result of a sensing process is obtained. Note that in order that a current is not supplied to the organic EL element 21 during a period from time t08 to time t09, the potential of the detection data line SN(m) needs to be set to a potential equal to, for example, the low-level power supply potential ELVSS before time t08.

At time t09, the third scanning signal MS (n) changes from low level to high level, by which the read transistor T9 goes into off state. By this, a sensing result reading process ends.

Note that a period from time t01 to time t02 corresponds to an initialization period, a period from time t03 to time t04 corresponds to a data write period, a period from time t06 to time t07 corresponds to a display period, and a period from time t08 to time t09 corresponds to a sensing result read period. Note also that an initializing step is implemented by operation performed during the period from time t01 to time t02, a data writing step is implemented by operation performed during the period from time t03 to time t04, a displaying step is implemented by operation performed during the period from time t06 to time t07, and a sensing result reading step is implemented by operation performed during the period from time t08 to time t09.

Meanwhile, when the potential at the control node NG is represented by Vng, the potential of the data signal DA(m) is represented by Vdata, the threshold voltage of the drive transistor T4 is represented by Vth, and a voltage corresponding to the amount of increase in potential at the control node NG resulting from a sensing process is represented by ΔVp, at time t07, the potential Vng at the control node NG in the pixel irradiated with light is represented by the following equation (1), and the potential Vng at the control node NG in the pixel not irradiated with light is represented by the following equation (2):

$$Vng = Vdata + Vth + \Delta Vp - ELVDD \quad (1)$$

$$Vng = Vdata + Vth - ELVDD \quad (2)$$

The potential at the control node NG at time t07 differs between the pixel irradiated with light and the pixel not irradiated with light as described above, and thus, a difference also occurs in the value of detection data. More specifically, depending on the intensity of radiated light, the potential at the control node NG at time t07 varies and the value of detection data also varies. Therefore, the intensity of light for each pixel can be grasped, and as a result, it becomes possible to detect a fingerprint pattern.

<1.3 Effects>

Figure 32:
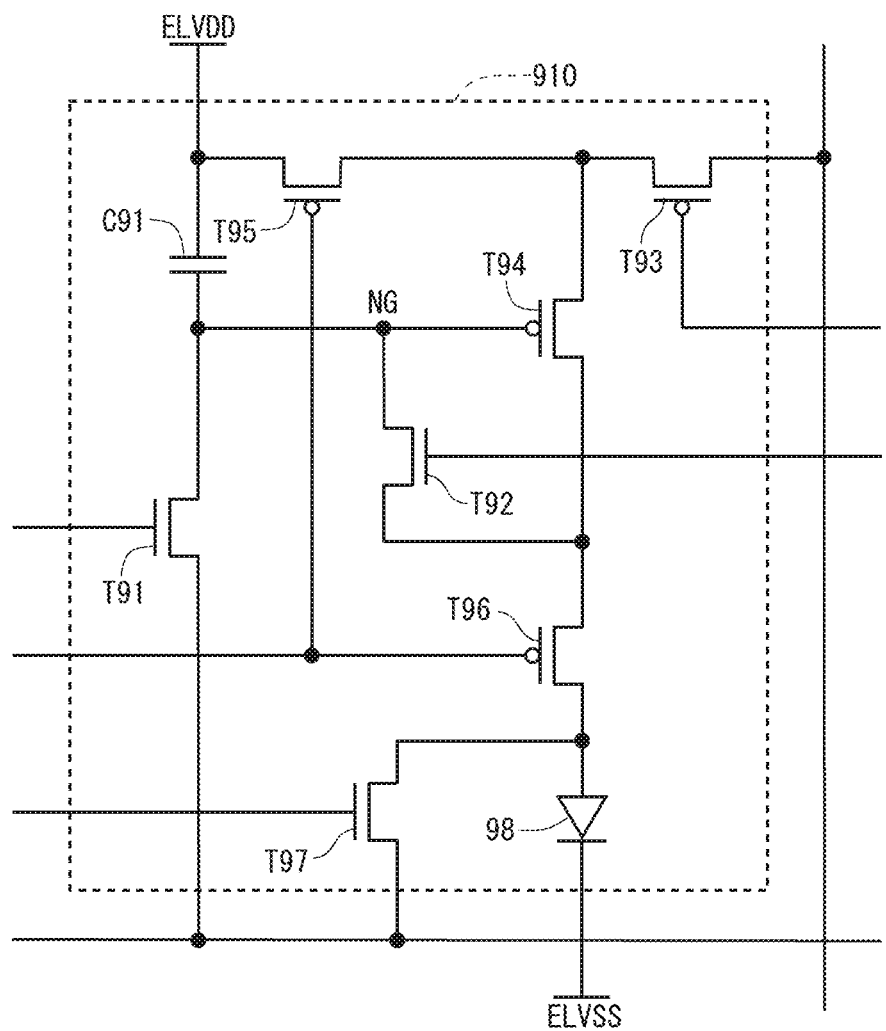
FIG. 32 is a circuit diagram showing a configuration of a pixel circuit of an organic EL display device that adopts an internal compensation scheme for a compensation process.
Figure 33:
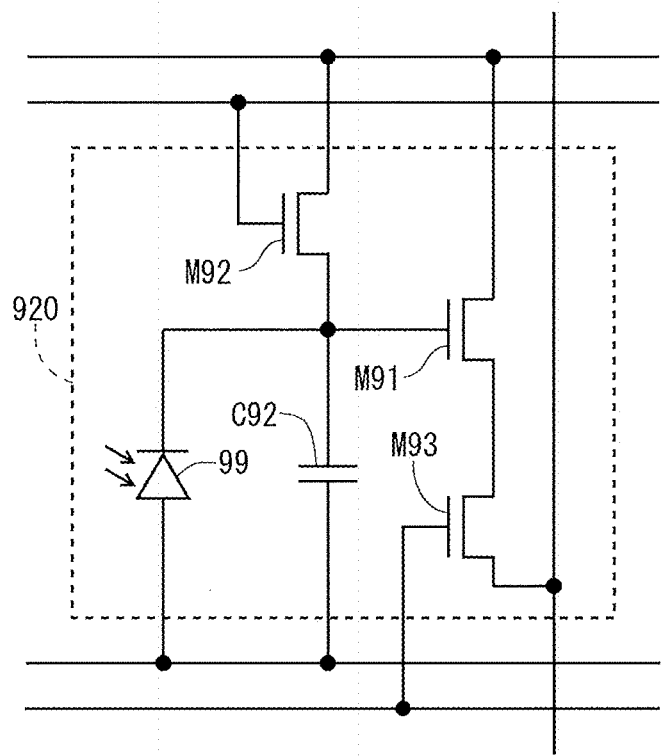
FIG. 33 is a circuit diagram showing a configuration of a general photosensor circuit.

According to the present embodiment, the pixel circuit 20 includes seven transistors T1 to T7 and one capacitor (holding capacitor) C1 in addition to the organic EL element 21, the sensor circuit 22 includes one photodiode 220 and one transistor (sensing control transistor) T8, and the read circuit 24 includes one transistor (read transistor) T9. That is, a pixel circuit with sensing function is implemented by nine transistors, one capacitor, and one photodiode in addition to the organic EL element. On the other hand, when the circuit having a configuration shown in FIG. 32 and the circuit having a configuration shown in FIG. 33 are combined together, ten transistors, two capacitors, and one photodiode in addition to an organic EL element are required per pixel. Therefore, according to the present embodiment, it becomes possible to implement a pixel circuit with sensing function, using a small number of elements.

Figure 31:
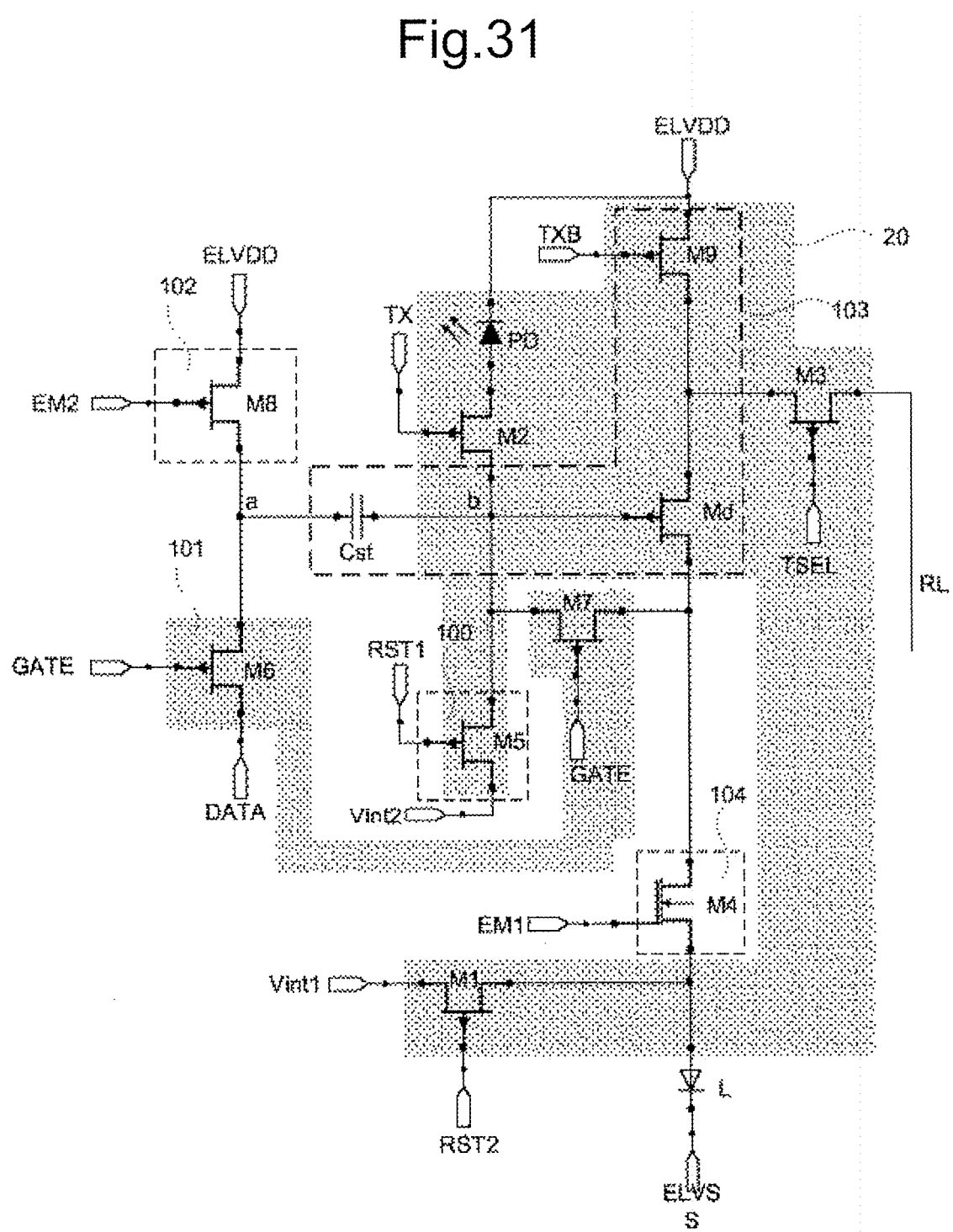
FIG. 31 is a circuit diagram of a pixel circuit with sensing function which is disclosed in US 2019/0355302 A.

Meanwhile, according to the pixel circuit with sensing function having a configuration shown in FIG. 31, a frame period for display operation and a frame period for sensing operation are provided separately, and during the frame period for sensing operation, a desired image is not displayed but a white solid image is displayed (see FIG. 34). That is, real-time reading (reading of a current depending on the amount of received light) cannot be performed while display operation and sensing operation are performed in a simultaneous and parallel manner. In addition, since there is a need to charge a read line RL during a period during which reading of a current depending on the amount of received light is performed, a read period is long. Furthermore, since a voltage read scheme is adopted, the read line RL needs to be initialized for every process for one row.

Figure 7:
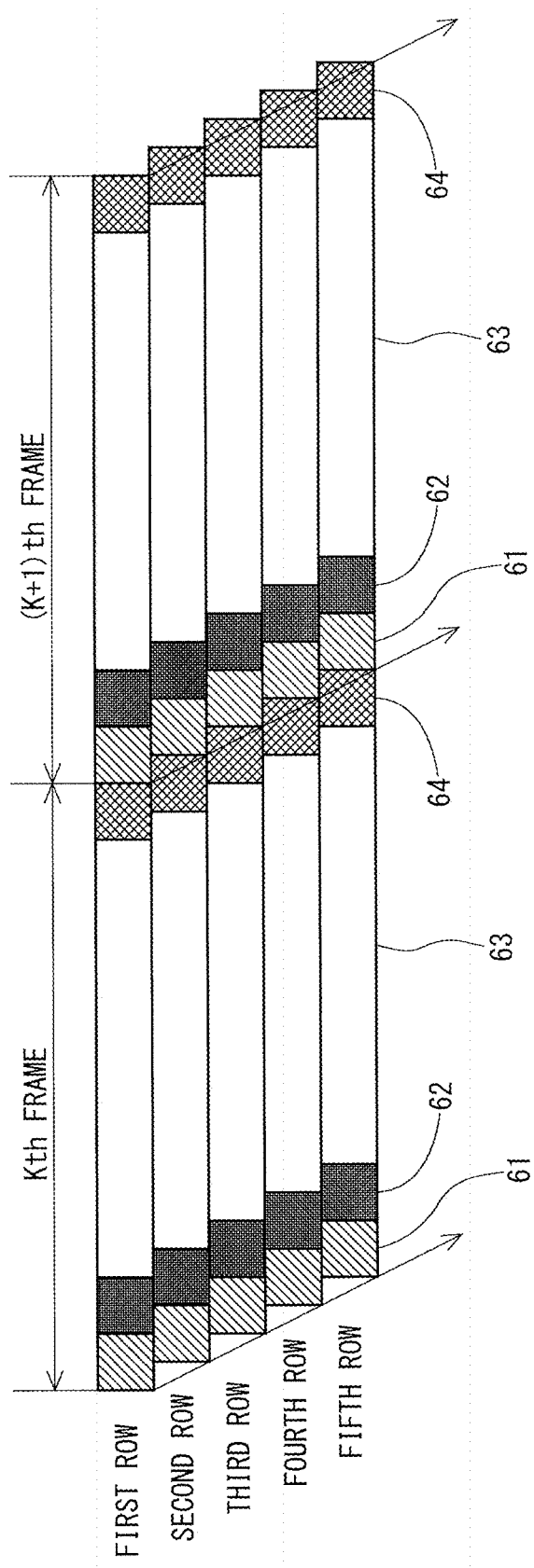
FIG. 7 is a diagram for describing operation performed during two consecutive frame periods in the first embodiment.

On the other hand, according to the present embodiment, operation performed during two consecutive frame periods is as shown in FIG. 7. In FIG. 7, a portion given reference character 61 represents a period during which initialization of the circuit is performed, a portion given reference character 62 represents a period during which writing of a data signal for image display is performed, a portion given reference character 63 represents a period during which light emission of the organic EL element (desired image display) and storing of charge depending on the amount of received light are performed, and a portion given reference character 64 represents a period during which reading of a current depending on the amount of received light is performed. As shown in FIG. 7, in both a Kth frame and a (K+1)th frame, both sensing operation and display operation are performed. That is, real-time reading (reading of a current depending on the amount of received light) is performed while sensing operation and display operation are performed in a simultaneous and parallel manner.

As such, according to the present embodiment, a pixel circuit with sensing function that can perform sensing operation and display operation in a simultaneous and parallel manner is implemented using a small number of elements.

In addition, regarding the pixel circuit with sensing function having a configuration shown in FIG. 31, when the potential at a terminal EM1 is represented by VEM1, a voltage between the gate and source of a transistor M4 is represented by Vgs, and the threshold voltage of the transistor M4 is represented by Vth, a current I flowing through a source follower circuit is represented by the following equation (3):

[Expression 1]

$$I \propto (Vgs - Vth)^2 \quad (3)$$
$$= (VEM1 - Vint1 - Vth)^2$$

∝ represents proportionality.

It can be grasped from the above equation (3) that in the pixel circuit with sensing function having a configuration shown in FIG. 31, the current I flowing through the source follower circuit is influenced by the threshold voltage Vth of the transistor M4. In addition, the potential of the read line RL is influenced by the threshold voltage of the transistor Md. Thus, results obtained by performing sensing operation are influenced by variations in the threshold voltage of transistors in a display unit. Therefore, there is concern that sufficient accuracy may not be able to be obtained.

On the other hand, according to the present embodiment, as described above, when the potential of the data signal DA(m) is represented by Vdata, the threshold voltage of the drive transistor T4 is represented by Vth, and a voltage corresponding to the amount of increase in potential at the control node NG resulting from a sensing process is represented by ΔVp, a current I read by performing a sensing result reading process is represented by the following equation (4):

[Expression 2]

$$I \propto (Vgs - Vth)^2 \quad (4)$$
$$= (Vdata + Vth + \Delta Vp - Vth)^2$$
$$= (Vdata + \Delta Vp)^2$$

∝ represents proportionality.

It can be grasped from the above equation (4) that the current I read by performing a sensing result reading process is not influenced by the threshold voltage Vth of the drive transistor T4. That is, it becomes possible to accurately detect a fingerprint pattern.

As such, according to the present embodiment, an effect of being able to accurately detect a fingerprint pattern can also be obtained.

2. Second Embodiment

In the following description, description of the same points as those of the first embodiment is omitted as appropriate.

<2.1 Configuration of a Pixel Circuit with Sensing Function>

Figure 8:
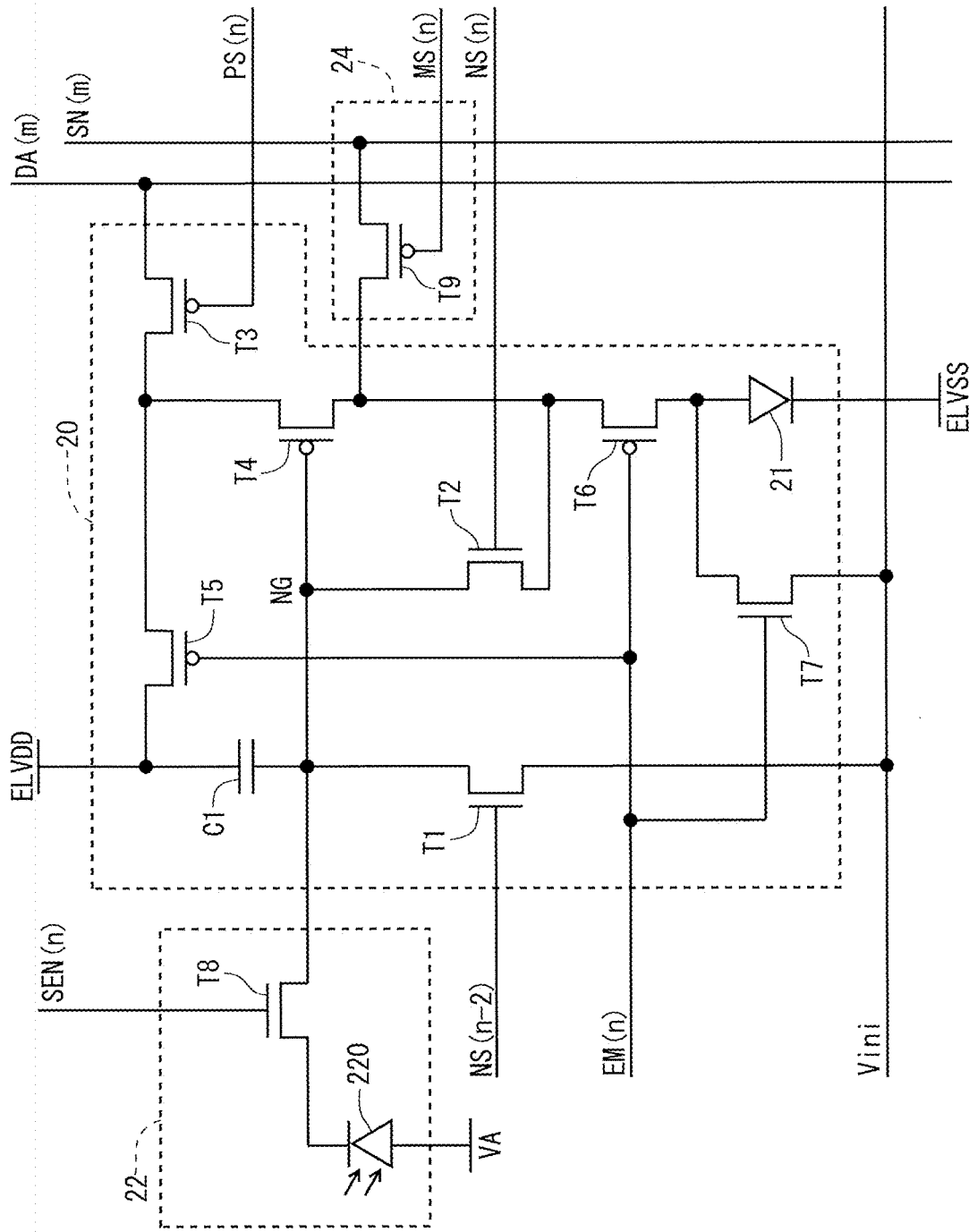
FIG. 8 is a circuit diagram showing a configuration of a pixel circuit with sensing function in a second embodiment.

FIG. 8 is a circuit diagram showing a configuration of a pixel circuit with sensing function in the second embodiment. As shown in FIG. 8, a sensor circuit 22 includes a photodiode 220 and a sensing control transistor T8. The photodiode 220 is connected at its anode terminal to a power line (hereinafter, referred to as "VA line" for the sake of convenience) that supplies a predetermined potential VA and connected at its cathode terminal to a first conductive terminal of the sensing control transistor T8. The sensing control transistor T8 is connected at its control terminal to a sensing control line SEN(n), connected at its first conductive terminal to the cathode terminal of the photodiode 220, and connected at its second conductive terminal to the control node NG. The potential VA supplied by the VA line is a potential smaller than the initialization potential Vini. Note that to the anode terminal of the photodiode 220 there may be provided a potential (e.g., the low-level power supply potential ELVSS or a low-level-side potential of a scanning signal GL) other than the above-described potential VA as long as the potential is smaller than the initialization potential Vini. That is, a reverse-bias voltage is to be applied to the photodiode 220. By a configuration such as that described above, during a period during which the sensing control transistor T8 is maintained in on state, a photocurrent depending on the intensity of light entering the photodiode 220 flows from the control node NG to the VA line through the sensing control transistor T8.

As with the first embodiment, in the present embodiment, too, the holding capacitor C1 is shared between a circuit for display operation and a circuit for sensing operation.

<2.2 Operation of the Pixel Circuit with Sensing Function>

Figure 9:
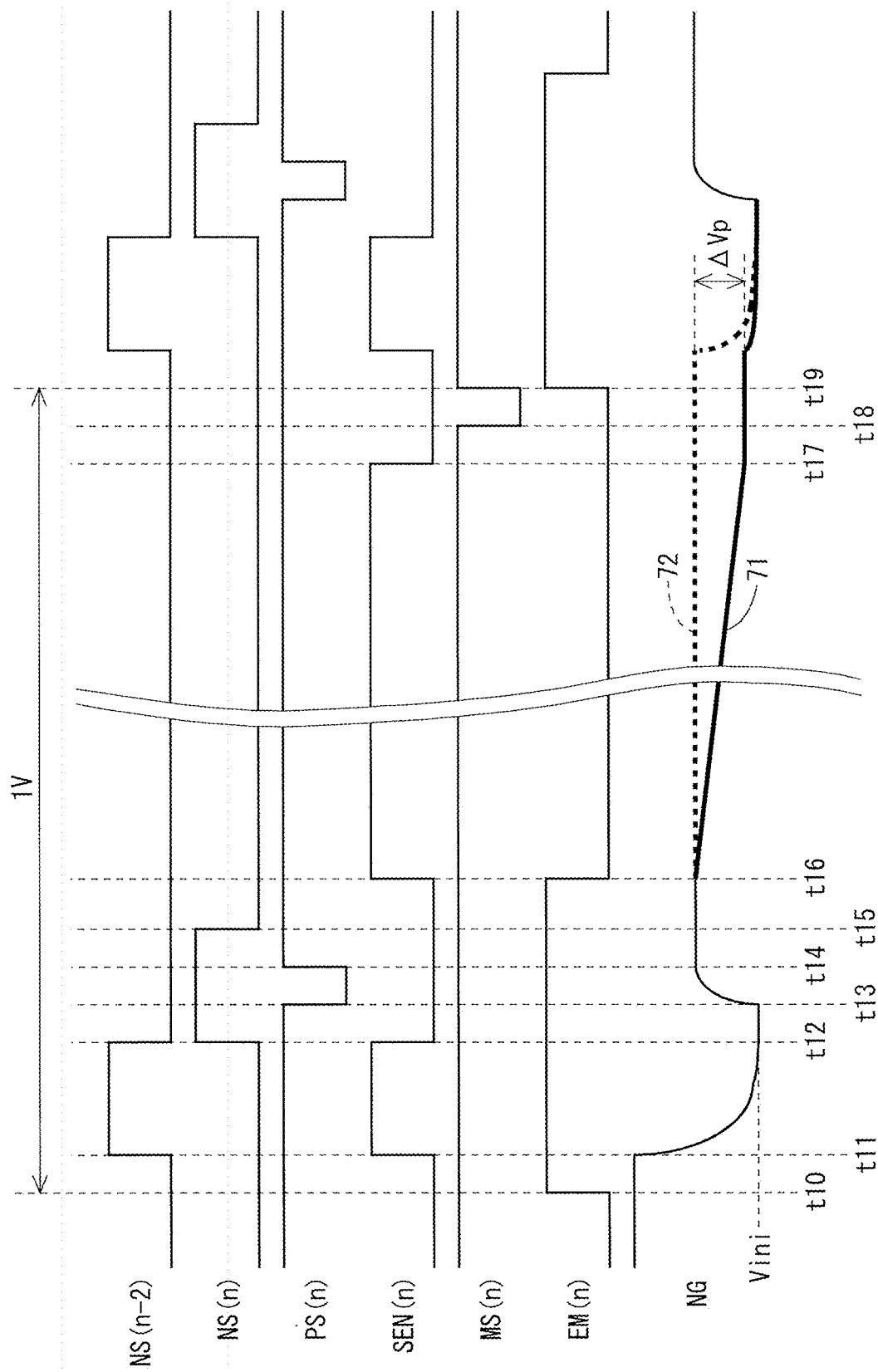
FIG. 9 is a waveform diagram for describing operation of the pixel circuit with sensing function in the second embodiment.

With reference to FIG. 9, operation of the pixel circuit with sensing function shown in FIG. 8 will be described. During a period from time t10 to time t16, the same operation as that performed during a period from time t00 to time t06 in the first embodiment (see FIG. 6) is performed. Note, however, that when the sensing control transistor T8 goes into on state at time t11, the cathode potential of the photodiode 220 is initialized based on the initialization potential Vini.

At time t16, a light-emission control signal EM(n) changes from high level to low level, by which the power supply control transistor T5 and the light-emission control transistor T6 go into on state. By this, a drive current depending on a potential at the control node NG is supplied to the organic EL element 21, and the organic EL element 21 emits light depending on the magnitude of the drive current. In addition, at time t16, a sensing control signal SEN(n) changes from low level to high level, by which the sensing control transistor T8 goes into on state. By this, a current depending on the intensity of light entering the photodiode 220 flows from the control node NG to the VA line through the sensing control transistor T8 and the photodiode 220. By this, during a period from time t16 to time t17, the potential at the control node NG decreases depending on the intensity of outside light. During a period after time t17, the same operation as that performed during a period after time t07 in the first embodiment is performed.

<2.3 Effects>

According to the present embodiment, as with the first embodiment, a pixel circuit with sensing function that can perform sensing operation and display operation in a simultaneous and parallel manner is implemented using a small number of elements.

3. Third Embodiment

<3.1 Configuration of a Pixel Circuit with Sensing Function>

Figure 10:
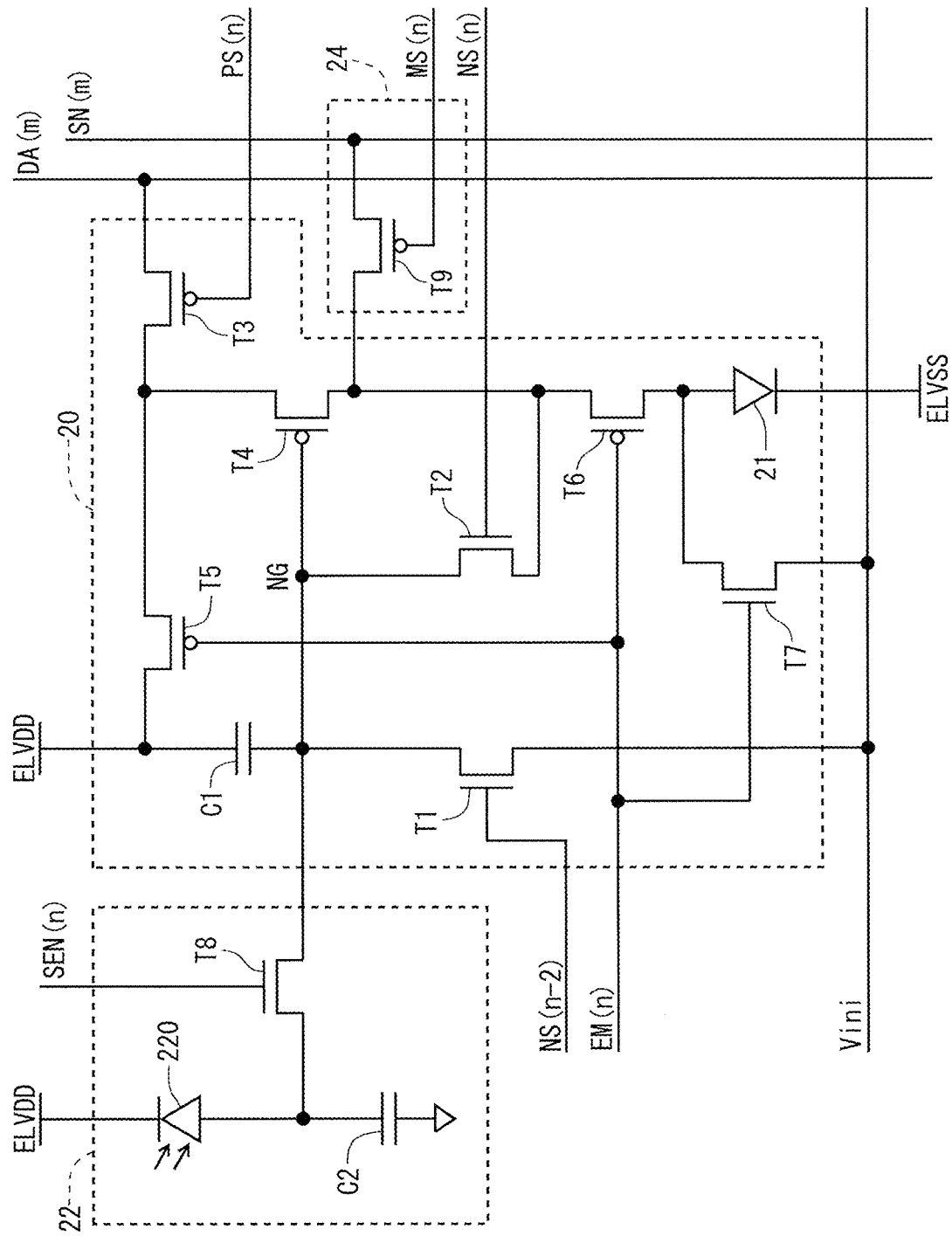
FIG. 10 is a circuit diagram showing a configuration of a pixel circuit with sensing function in a third embodiment.

FIG. 10 is a circuit diagram showing a configuration of a pixel circuit with sensing function in the third embodiment. As shown in FIG. 10, a sensor circuit 22 includes a photodiode 220, a sensing control transistor T8, and a sensing capacitor C2. The photodiode 220 is connected at its anode terminal to a first conductive terminal of the sensing control transistor T8 and a first electrode of the sensing capacitor C2, and connected at its cathode terminal to the high-level power line. The sensing control transistor T8 is connected at its control terminal to a sensing control line SEN(n), connected at its first conductive terminal to the anode terminal of the photodiode 220 and the first electrode of the sensing capacitor C2, and connected at its second conductive terminal to the control node NG. The sensing capacitor C2 is connected at its first electrode to the anode terminal of the photodiode 220 and the first conductive terminal of the sensing control transistor T8 and is grounded at its second electrode.

By a configuration such as that described above, during a period during which the first initialization transistor T1 and the sensing control transistor T8 are maintained in on state, the anode potential of the photodiode 220 is initialized. During a period during which the sensing control transistor T8 is maintained in off state, a photocurrent depending on the intensity of light entering the photodiode 220 flows from the high-level power line to the sensing capacitor C2 through the photodiode 220. During a period during which the first initialization transistor T1 is maintained in off state and the sensing control transistor T8 is maintained in on state, charge sharing (re-sharing of charge) is performed between the holding capacitor C1 and the sensing capacitor C2.

Note that an oxide TFT such as an IGZO-TFT has a very small off-state leakage current, and thus, by adopting an oxide TFT as the sensing control transistor T8, an effect of improving the accuracy of a sensing process can be obtained.

<3.2 Operation of the Pixel Circuit with Sensing Function>

Figure 11:
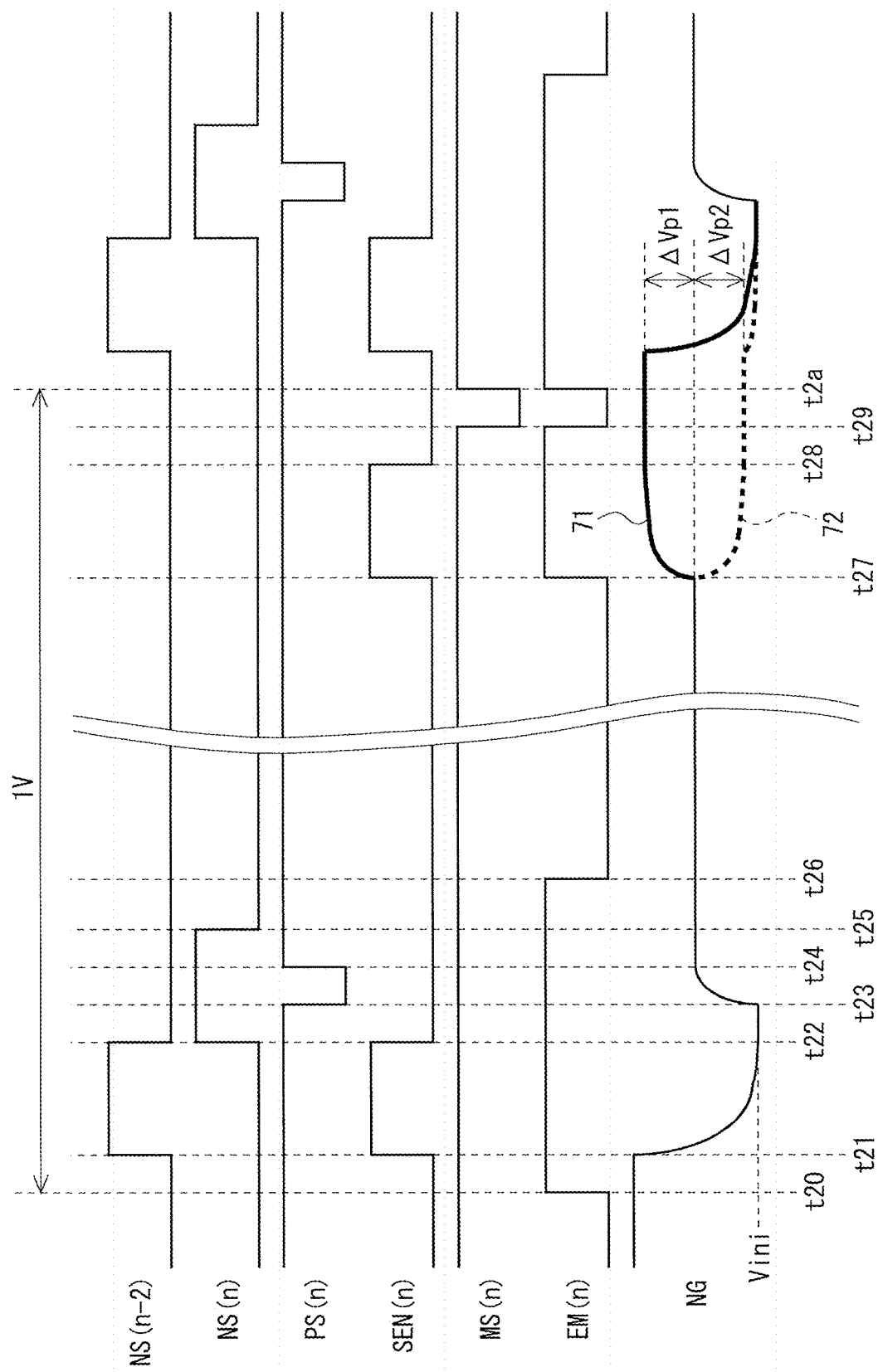
FIG. 11 is a waveform diagram for describing operation of the pixel circuit with sensing function in the third embodiment.

With reference to FIG. 11, operation of the pixel circuit with sensing function shown in FIG. 10 will be described. During a period from time t20 to time t26, the same operation as that performed during a period from time t00 to time t06 in the first embodiment (see FIG. 6) is performed. Note, however, that during a period after time t22, a photocurrent depending on the intensity of light entering the photodiode 220 flows from the high-level power line to the sensing capacitor C2 through the photodiode 220, and the anode potential of the photodiode 220 increases.

At time t26, a light-emission control signal EM(n) changes from high level to low level, by which the power supply control transistor T5 and the light-emission control transistor T6 go into on state. By this, a drive current depending on a potential at the control node NG is supplied to the organic EL element 21, and the organic EL element 21 emits light depending on the magnitude of the drive current. Meanwhile, unlike the first embodiment, during a period from time t26 to time t27, a sensing control signal SEN(n) is maintained at low level. Therefore, regardless of the intensity of outside light, the potential at the control node NG does not change during the period from time t26 to time t27. Note that during the period from time t26 to time t27, too, a photocurrent depending on the intensity of light entering the photodiode 220 flows from the high-level power line to the sensing capacitor C2 through the photodiode 220, and the anode potential of the photodiode 220 increases.

At time t27, the light-emission control signal EM(n) changes from low level to high level, by which the power supply control transistor T5 and the light-emission control transistor T6 go into off state. By this, the supply of the current to the organic EL element 21 is interrupted and the organic EL element 21 goes into turn-off state. In addition, at time t27, the sensing control signal SEN (n) changes from low level to high level, by which the sensing control transistor T8 goes into on state. By this, charge sharing is performed between the holding capacitor C1 and the sensing capacitor C2. The anode potential of the photodiode 220 increases depending on the intensity of outside light during a period from time t22 to time t27. Thus, by the charge sharing, the potential at the control node NG changes depending on the intensity of outside light. Regarding this, in a pixel irradiated with high-intensity light, the potential at the control node NG increases, and in a pixel not irradiated with light, the potential at the control node NG decreases.

Note that the light-emission control signal EM(n) may be maintained at low level during a period from time t27 to time t29.

At time t28, the sensing control signal SEN(n) changes from high level to low level, by which the sensing control transistor T8 goes into off state. By this, the change in potential at the control node NG stops.

At time t29, a third scanning signal MS(n) changes from high level to low level, by which the read transistor T9 goes into on state. In addition, at time t29, the light-emission control signal EM(n) changes from high level to low level, by which the power supply control transistor T5 and the light-emission control transistor T6 go into on state. Thus, a current depending on the potential at the control node NG flows from the high-level power line to the detection data line SN (m) through the power supply control transistor T5, the drive transistor T4, and the read transistor T9. Then, the data conversion circuit 50 performs AD conversion based on the current, by which digital sensing data DS depending on a result of a sensing process is obtained.

At time t2a, the third scanning signal MS (n) changes from low level to high level, by which the read transistor T9 goes into off state. By this, a sensing result reading process ends.

Note that a period from time t21 to time t22 corresponds to an initialization period, a period from time t23 to time t24 corresponds to a data write period, a period from time t26 to time t27 corresponds to a display period, a period from time t27 to time t28 corresponds to a charge sharing period, and a period from time t29 to time t2a corresponds to a sensing result read period. Note also that an initializing step is implemented by operation performed during the period from time t21 to time t22, a data writing step is implemented by operation performed during the period from time t23 to time t24, a displaying step is implemented by operation performed during the period from time t26 to time t27, and a sensing result reading step is implemented by operation performed during the period from time t29 to time t2a.

In an example shown in FIG. 11, at time t28, the potential Vng at the control node NG in a pixel irradiated with high-intensity light is represented by the following equation (5), and the potential Vng at the control node NG in a pixel not irradiated with light is represented by the following equation (6):

$$Vng = Vdata + Vth + \Delta Vp1 - ELVDD \qquad (5)$$

$$Vng = Vdata + Vth - \Delta Vp2 - ELVDD \qquad (6)$$

It can be grasped from the above description that the potential at the control node NG at time t28 varies depending on the intensity of radiated light. That is, in the present embodiment, too, the value of detection data varies depending on the intensity of radiated light, and thus, a fingerprint pattern can be detected based on the value of detection data.

<3.3 Effects>

According to the present embodiment, the pixel circuit 20 includes seven transistors T1 to T7 and one capacitor (holding capacitor) C1 in addition to the organic EL element 21, the sensor circuit 22 includes one photodiode 220, one transistor (sensing control transistor) T8, and one capacitor (sensing capacitor) C2, and the read circuit 24 includes one transistor (read transistor) T9. That is, a pixel circuit with sensing function is implemented by nine transistors, two capacitors, and one photodiode in addition to the organic EL element. On the other hand, when the circuit having a configuration shown in FIG. 32 and the circuit having a configuration shown in FIG. 33 are combined together, ten transistors, two capacitors, and one photodiode in addition to an organic EL element are required per pixel. Therefore, according to the present embodiment, it becomes possible to implement a pixel circuit with sensing function, using a small number of elements.

In addition, sensing operation is performed during a period from time t22 to time t27 of FIG. 11 and display operation is performed during a period from time t26 to time t27 of FIG. 11. That is, during the period from time t26 to time t27, the sensing operation and the display operation are performed in a simultaneous and parallel manner.

Therefore, as with the first embodiment, a pixel circuit with sensing function that can perform sensing operation and display operation in a simultaneous and parallel manner is implemented using a small number of elements.

Furthermore, although, in the first embodiment and the second embodiment, a change in potential at the control node NG influences a displayed image during a period during which display operation is performed, in the present embodiment, the potential at the control node NG does not change during a period during which display operation is performed, and thus, a sensing process can be performed with desired image display maintained. Thus, according to the present embodiment, it becomes possible to detect a fingerprint pattern without degrading display quality.

4. Fourth Embodiment

<4.1 Configuration of a Pixel Circuit with Sensing Function>

Figure 12:
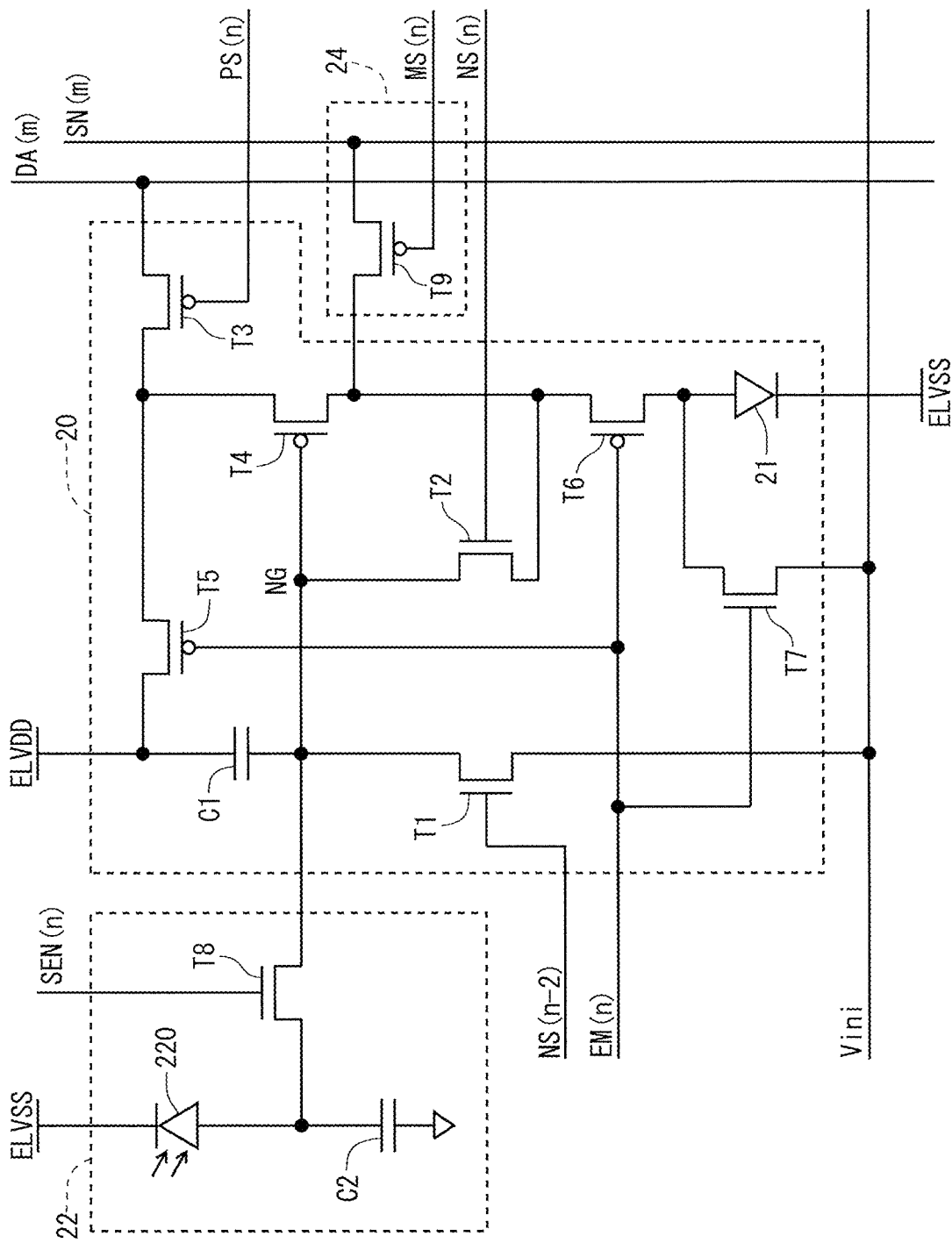
FIG. 12 is a circuit diagram showing a configuration of a pixel circuit with sensing function in a fourth embodiment.

FIG. 12 is a circuit diagram showing a configuration of a pixel circuit with sensing function in the fourth embodiment. Although, in the third embodiment, the cathode terminal of the photodiode 220 is connected to the high-level power line, in the present embodiment, the cathode terminal of the photodiode 220 is connected to the low-level power line. Configurations other than that are the same as those in the third embodiment. Note that in the present embodiment, the initialization potential Vini is set to a potential lower than the low-level power supply potential ELVSS so as to apply a reverse-bias voltage to the photodiode 220. By a configuration such as that described above, the sensor circuit 22 in the present embodiment operates in the same manner as the sensor circuit 22 in the third embodiment.

<4.2 Operation of the Pixel Circuit with Sensing Function>

Figure 13:
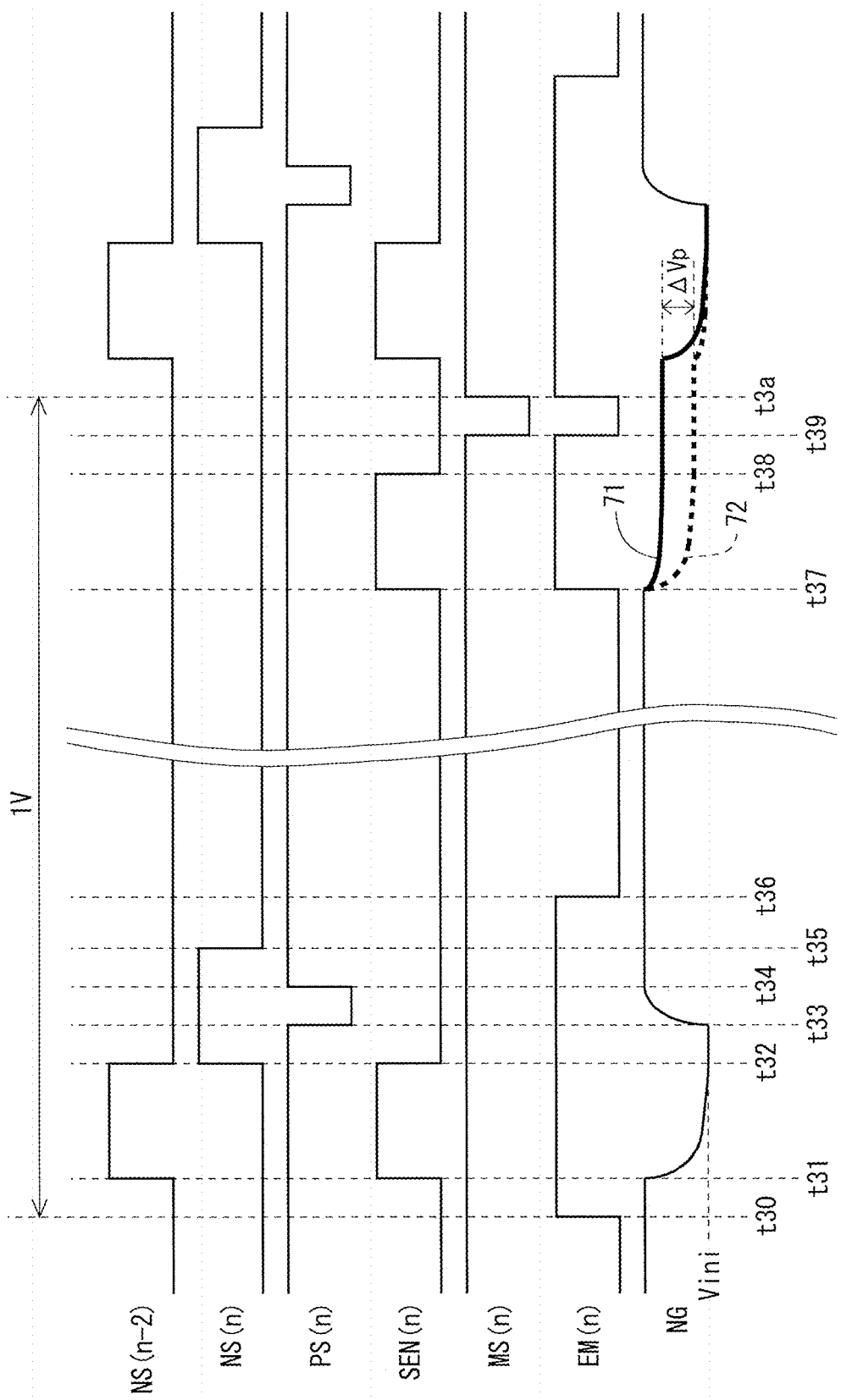
FIG. 13 is a waveform diagram for describing operation of the pixel circuit with sensing function in the fourth embodiment.

With reference to FIG. 13, operation of the pixel circuit with sensing function shown in FIG. 12 will be described. During a period from time t30 to time t37, the same operation as that performed during a period from time t20 to time t27 in the third embodiment (see FIG. 11) is performed.

During a period from time t37 to time t38, as with period from time t27 to time t28 in the third embodiment (see FIG. 11), charge sharing is performed between the holding capacitor C1 and the sensing capacitor C2. Here, in the present embodiment, the anode potential of the photodiode 220 does not increase to a level higher than the low-level power supply potential ELVSS, and thus, in a pixel irradiated with light, too, the potential at the control node NG decreases after time t37. Note, however, that the magnitude of the decrease in potential at the control node NG after time t37 is a magnitude depending on the intensity of outside light. During a period after time t38, the same operation as that performed during a period after time t28 in the third embodiment (see FIG. 11) is performed.

<4.3 Effects>

In the present embodiment, too, a pixel circuit with sensing function that can perform sensing operation and display operation in a simultaneous and parallel manner is implemented using a small number of elements. In addition, as with the third embodiment, it becomes possible to detect a fingerprint pattern without degrading display quality. Furthermore, by adopting an organic photodiode as the photodiode 220, a cathode terminal of the organic photodiode and the cathode terminal of the organic EL element 21 in the pixel circuit 20 are connected to the same low-level power line, and thus, it is advantageous in terms of a manufacturing process.

5. Fifth Embodiment

<5.1 Configuration of a Pixel Circuit with Sensing Function>

Figure 14:
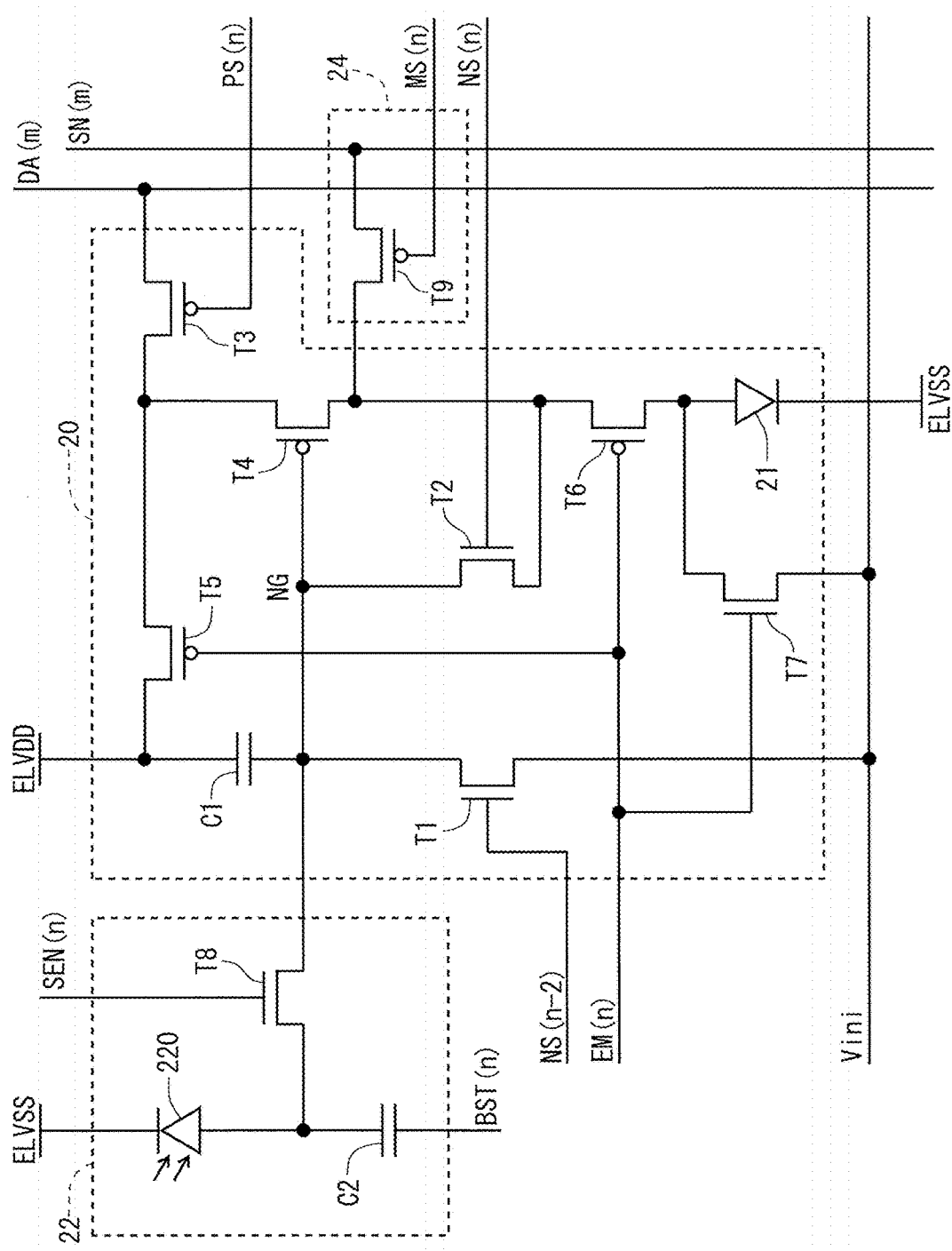
FIG. 14 is a circuit diagram showing a configuration of a pixel circuit with sensing function in a fifth embodiment.

FIG. 14 is a circuit diagram showing a configuration of a pixel circuit with sensing function in the fifth embodiment. Although, in the fourth embodiment, the second electrode of the sensing capacitor C2 is grounded, in the present embodiment, a control signal BST (n) is provided to the second electrode of the sensing capacitor C2. Configurations other than that are the same as those in the fourth embodiment.

<5.2 Operation of the Pixel Circuit with Sensing Function>

Figure 15:
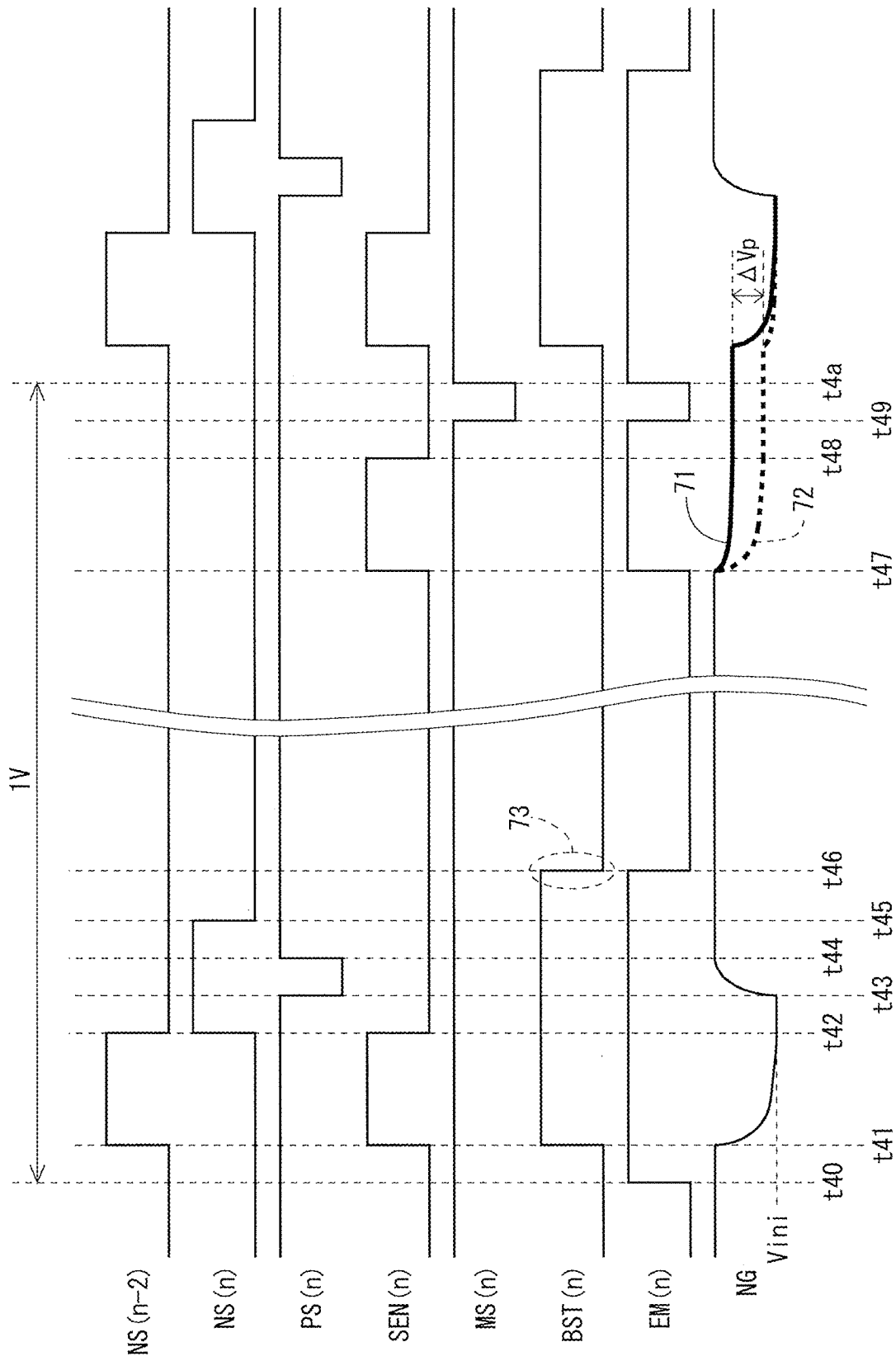
FIG. 15 is a waveform diagram for describing operation of the pixel circuit with sensing function in the fifth embodiment.

With reference to FIG. 15, operation of the pixel circuit with sensing function shown in FIG. 14 will be described. In the present embodiment, almost the same operation as that in the third embodiment and the fourth embodiment is performed. Note, however, that at time t46, as shown in a portion given reference character 73, the control signal BST(n) changes from high level to low level. By this, a larger reverse-bias voltage is applied to the photodiode 220. That is, it becomes possible to apply a large reverse-bias voltage to the photodiode 220, regardless of the potential applied to the cathode terminal of the photodiode 220.

Note that in order to obtain the same effect, the light-emission control signal EM(n) or the sensing control signal SEN(n) may be provided to the second electrode of the sensing capacitor C2.

<5.3 Effects>

According to the present embodiment, in addition to being able to obtain the same effects as those in the fourth embodiment, an effect of increasing flexibility in setting of various types of voltage (potential) (setting of the low-level power supply potential ELVSS, the initialization potential Vini, etc.) can be obtained. In addition, as with the fourth embodiment, by adopting an organic photodiode as the photodiode 220, a cathode terminal of the organic photodiode and the cathode terminal of the organic EL element 21 in the pixel circuit 20 are connected to the same low-level power line, and thus, it is advantageous in terms of a manufacturing process.

6. Sixth Embodiment

<6.1 Configuration of a Pixel Circuit with Sensing Function>

Figure 16:
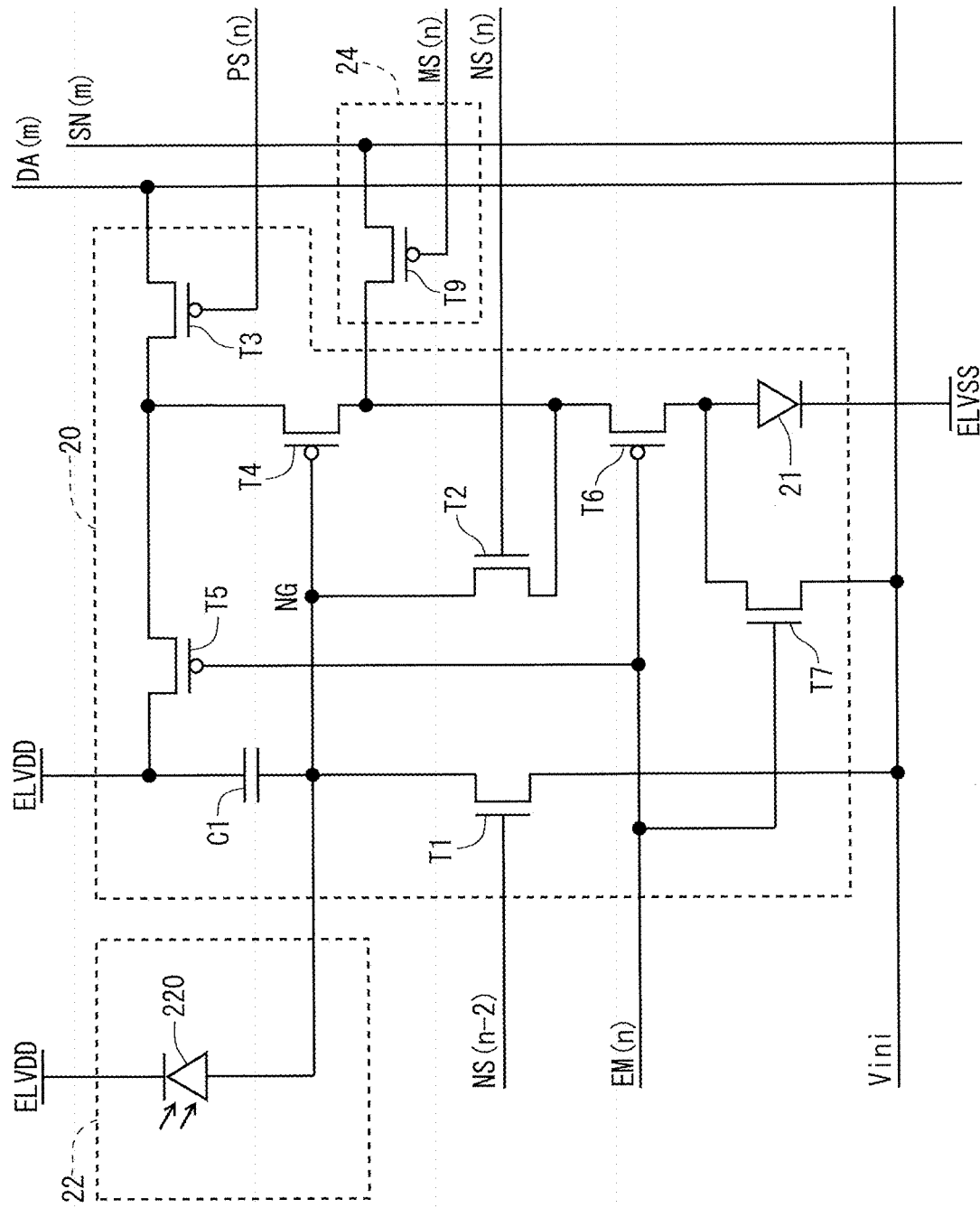
FIG. 16 is a circuit diagram showing a configuration of a pixel circuit with sensing function in a sixth embodiment.

FIG. 16 is a circuit diagram showing a configuration of a pixel circuit with sensing function in the sixth embodiment. As shown in FIG. 16, a sensor circuit 22 includes only a photodiode 220. The photodiode 220 is connected at its anode terminal to the control node NG and connected at its cathode terminal to the high-level power line. As such, the sensor circuit 22 in the present embodiment has a configuration in which the sensing control transistor T8 is removed from the sensor circuit 22 in the first embodiment (see FIG. 1). A configuration can also be adopted in which the sensing control transistor T8 is removed from the sensor circuit 22 in the second embodiment (see FIG. 8).

Note that the configuration of the present embodiment can be adopted in a case in which a photocurrent generated in the photodiode 220 is sufficiently small compared to a current flowing through the write control transistor T3, the drive transistor T4, and the threshold voltage compensation transistor T2 upon writing a data signal DA(m).

<6.2 Operation of the Pixel Circuit with Sensing Function>

Figure 17:
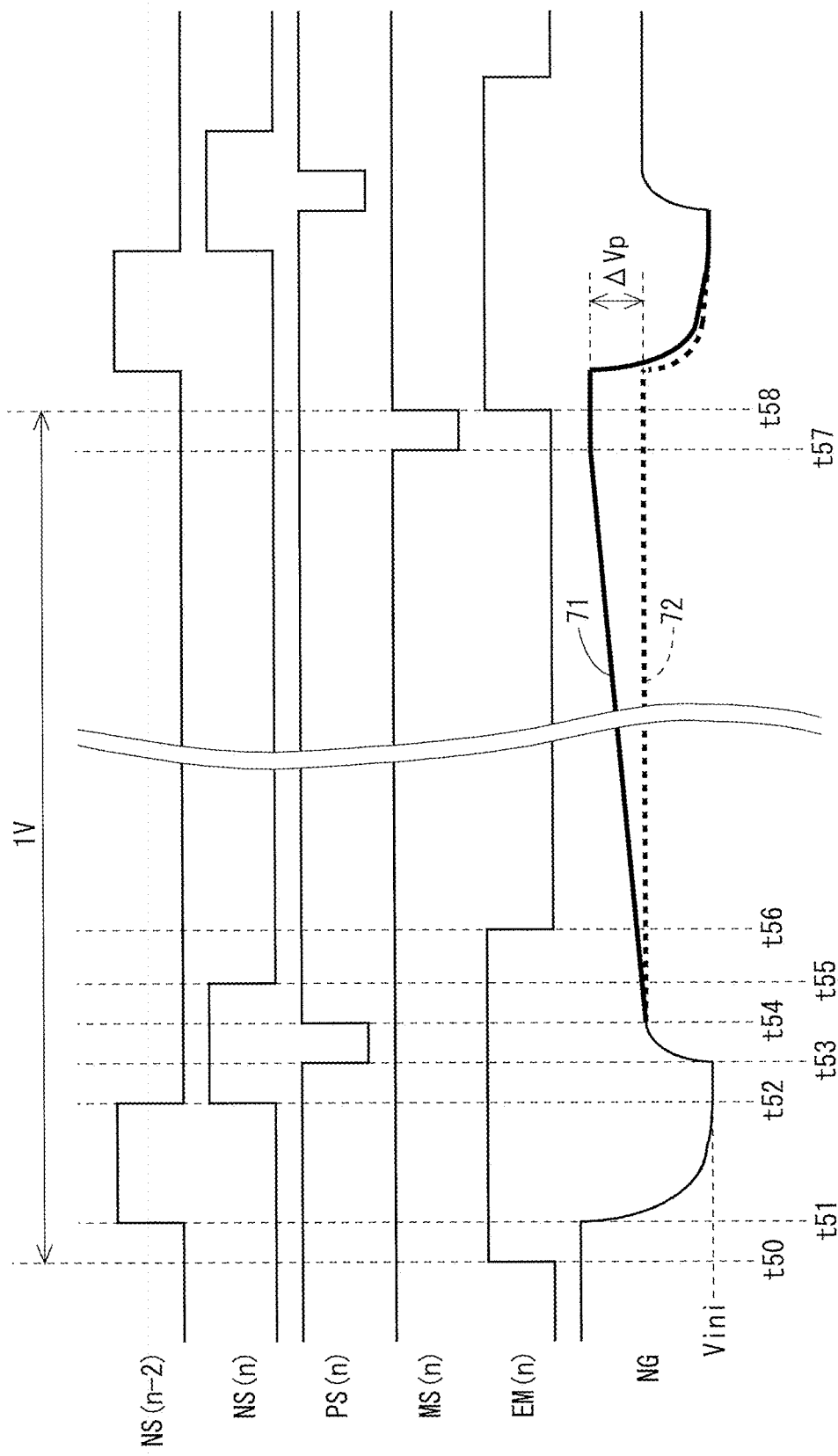
FIG. 17 is a waveform diagram for describing operation of the pixel circuit with sensing function in the sixth embodiment.

With reference to FIG. 17, operation of the pixel circuit with sensing function shown in FIG. 16 will be described. During a period from time t50 to time t51, the same operation as that performed during a period from time t00 to time t01 in the first embodiment (see FIG. 6) is performed.

At time t51, a first scanning signal NS(n−2) changes from low level to high level, by which the first initialization transistor T1 goes into on state. By this, the potential at the control node NG and the anode potential of the photodiode 220 are initialized based on the initialization potential Vini.

At time t52, the first scanning signal NS(n−2) changes from high level to low level. By this, the first initialization transistor T1 goes into off state. In addition, at time t52, a first scanning signal NS(n) changes from low level to high level, by which the threshold voltage compensation transistor T2 goes into on state. During a period from time t53 to time t54, the same operation as that performed during a period from time t03 to time t04 in the first embodiment (see FIG. 6) is performed.

At time t54, a second scanning signal PS(n) changes from low level to high level, by which the write control transistor T3 goes into off state and writing of a data signal DA(m) is terminated. During a period after the time t54, the potential at the control node NG increases depending on the intensity of light (the intensity of outside light) entering the photodiode 220. At time t55, the first scanning signal NS(n) changes from high level to low level, by which the threshold voltage compensation transistor T2 goes into off state.

At time t56, a light-emission control signal EM(n) changes from high level to low level, by which the power supply control transistor T5 and the light-emission control transistor T6 go into on state. By this, a drive current depending on a potential at the control node NG is supplied to the organic EL element 21, and the organic EL element 21 emits light depending on the magnitude of the drive current. During a period after time t57, the same operation as that performed during a period after time t08 in the first embodiment (see FIG. 6) is performed.

<6.3 Effects>

According to the present embodiment, the pixel circuit 20 includes seven transistors T1 to T7 and one capacitor (holding capacitor) C1 in addition to the organic EL element 21, the sensor circuit 22 includes one photodiode 220, and the read circuit 24 includes one transistor (read transistor) T9. That is, a pixel circuit with sensing function is implemented by eight transistors, one capacitor, and one photodiode in addition to the organic EL element. On the other hand, when the circuit having a configuration shown in FIG. 32 and the circuit having a configuration shown in FIG. 33 are combined together, ten transistors, two capacitors, and one photodiode in addition to an organic EL element are required per pixel. Therefore, according to the present embodiment, it becomes possible to implement a pixel circuit with sensing function, using a remarkably small number of elements. In addition, in the present embodiment, too, sensing operation and display operation are performed in a simultaneous and parallel manner. That is, according to the present embodiment, a pixel circuit with sensing function that can perform sensing operation and display operation in a simultaneous and parallel manner is implemented using a remarkably small number of elements.

7. Seventh Embodiment

<7.1 Configuration of a Pixel Circuit with Sensing Function>

Figure 18:
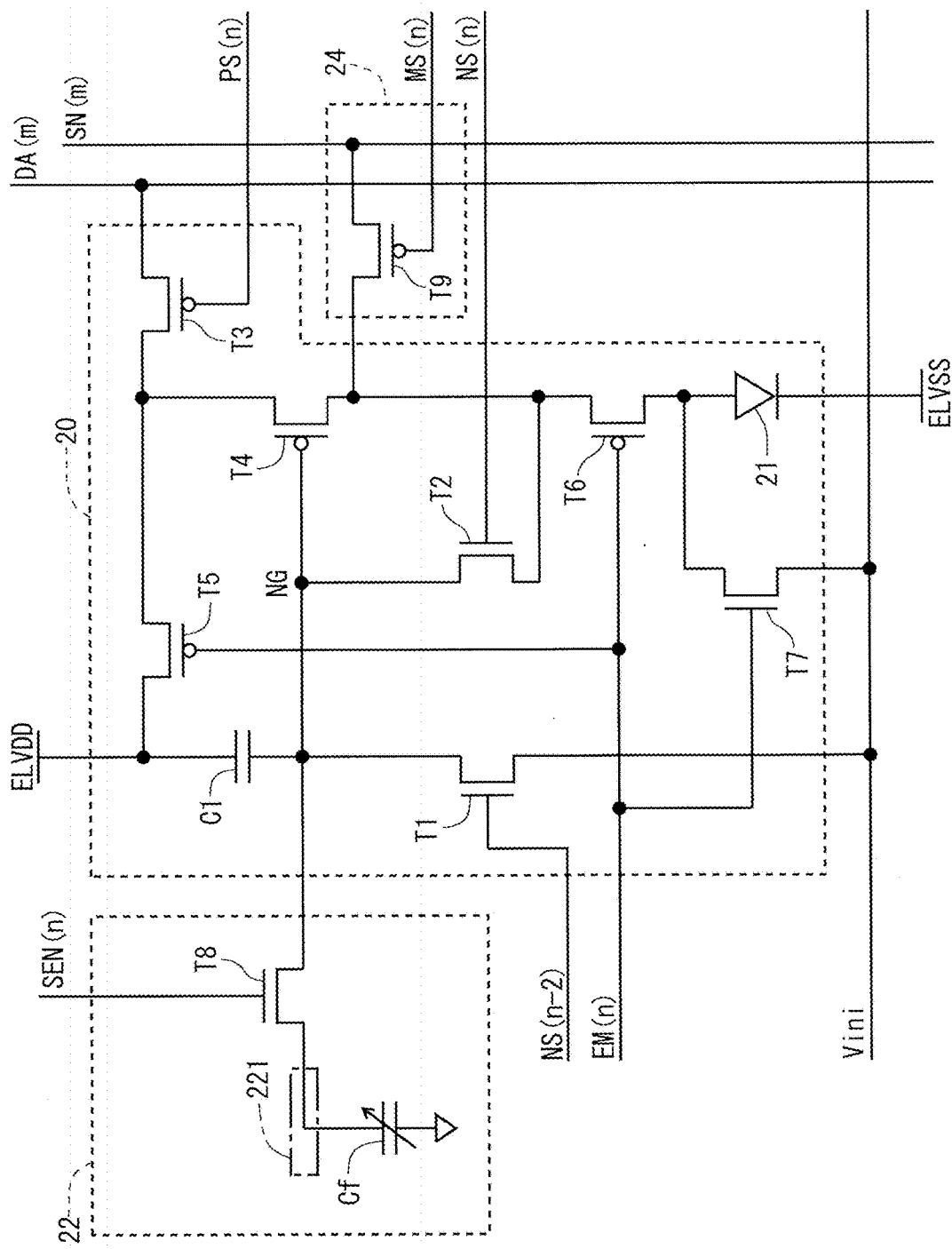
FIG. 18 is a circuit diagram showing a configuration of a pixel circuit with sensing function in a seventh embodiment.

FIG. 18 is a circuit diagram showing a configuration of a pixel circuit with sensing function in the seventh embodiment. As shown in FIG. 18, a sensor circuit 22 includes a sensing control transistor T8 and a sensor electrode 221 provided so as to form self-capacitance Cf between an operator's finger and the sensor electrode 221. The sensing control transistor T8 is connected at its control terminal to a sensing control line SEN (n), connected at its first conductive terminal to the sensor electrode 221, and connected at its second conductive terminal to the control node NG. Since the magnitude of self-capacitance Cf formed between the sensor electrode 221 and the operator's finger depends on the degree of contact between the sensor electrode 221 and the operator's finger, the sensor circuit 22 in the present embodiment is equivalent to a circuit including the sensing control transistor T8 and a variable capacitor.

By a configuration such as that described above, during a period during which the first initialization transistor T1 and the sensing control transistor T8 are maintained in on state, the potential of the sensor electrode 221 is initialized. During a period during which the sensing control transistor T8 is maintained in off state, self-capacitance Cf is formed depending on the degree of contact between the sensor electrode 221 and the operator's finger. During a period during which the first initialization transistor T1 is maintained in off state and the sensing control transistor T8 is maintained in on state, charge sharing (re-sharing of charge) is performed between the formed self-capacitance Cf and the holding capacitor C1.

As above, in the present embodiment, unlike the first to sixth embodiments, self-capacitance Cf is detected by the sensor circuit 22.

<7.2 Operation of the Pixel Circuit with Sensing Function>

Figure 19:
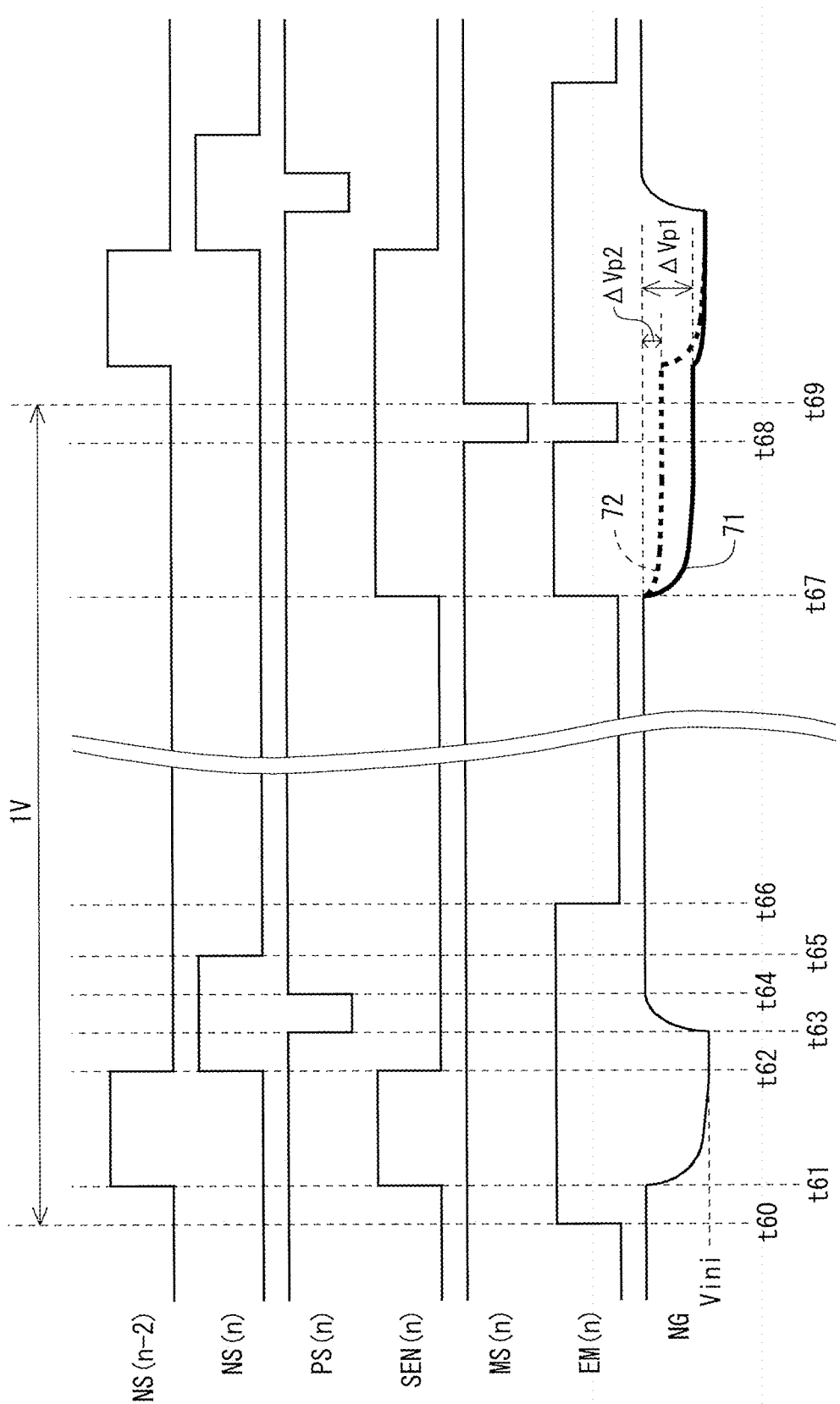
FIG. 19 is a waveform diagram for describing operation of the pixel circuit with sensing function in the seventh embodiment.

With reference to FIG. 19, operation of the pixel circuit with sensing function shown in FIG. 18 will be described. During a period from time t60 to time t67, the same operation as that performed during a period from time t20 to time t27 in the third embodiment (see FIG. 11) is performed. Note, however, that when the sensing control transistor T8 goes into on state at time t61, the potential of the sensor electrode 221 is initialized based on the initialization potential Vini. In addition, during a period after time t62, self-capacitance Cf is formed depending on the degree of contact between the sensor electrode 221 and an operator's finger.

At time t67, a light-emission control signal EM(n) changes from low level to high level, by which the power supply control transistor T5 and the light-emission control transistor T6 go into off state. By this, supply of a current to the organic EL element 21 is interrupted and the organic EL element 21 goes into turn-off state. In addition, at time t67, a sensing control signal SEN(n) changes from low level to high level, by which the sensing control transistor T8 goes into on state. By this, charge sharing is performed between the formed self-capacitance Cf and the holding capacitor C1. As a result, the potential at the control node NG changes depending on the magnitude of the self-capacitance Cf. Meanwhile, the magnitude of the self-capacitance Cf depends on the degree of contact between the sensor electrode 221 and the operator's finger. Thus, during a period from time t67 to time t68, the potential at the control node NG changes depending on the degree of contact between the sensor electrode 221 and the operator's finger. During a period after time t68, the same operation as that performed during a period after time t29 in the third embodiment (see FIG. 11) is performed.

In an example shown in FIG. 19, at time t68, the potential Vng at the control node NG in a pixel with large self-capacitance Cf is represented by the following equation (7), and the potential Vng at the control node NG in a pixel with small self-capacitance Cf is represented by the following equation (8):

$$Vng = Vdata + Vth - \Delta Vp1 - ELVDD \quad (7)$$

$$Vng = Vdata + Vth - \Delta Vp2 - ELVDD \quad (8)$$

As above, the potential at the control node NG at time t68 varies depending on the magnitude of the self-capacitance Cf. Thus, in the present embodiment, too, a fingerprint pattern can be detected based on the value of detection data.

<7.3 Effects>

In the present embodiment, too, a pixel circuit with sensing function that can perform sensing operation and display operation in a simultaneous and parallel manner is implemented using a small number of elements.

8. Eighth Embodiment

<8.1 Configuration of a Pixel Circuit with Sensing Function>

Figure 20:
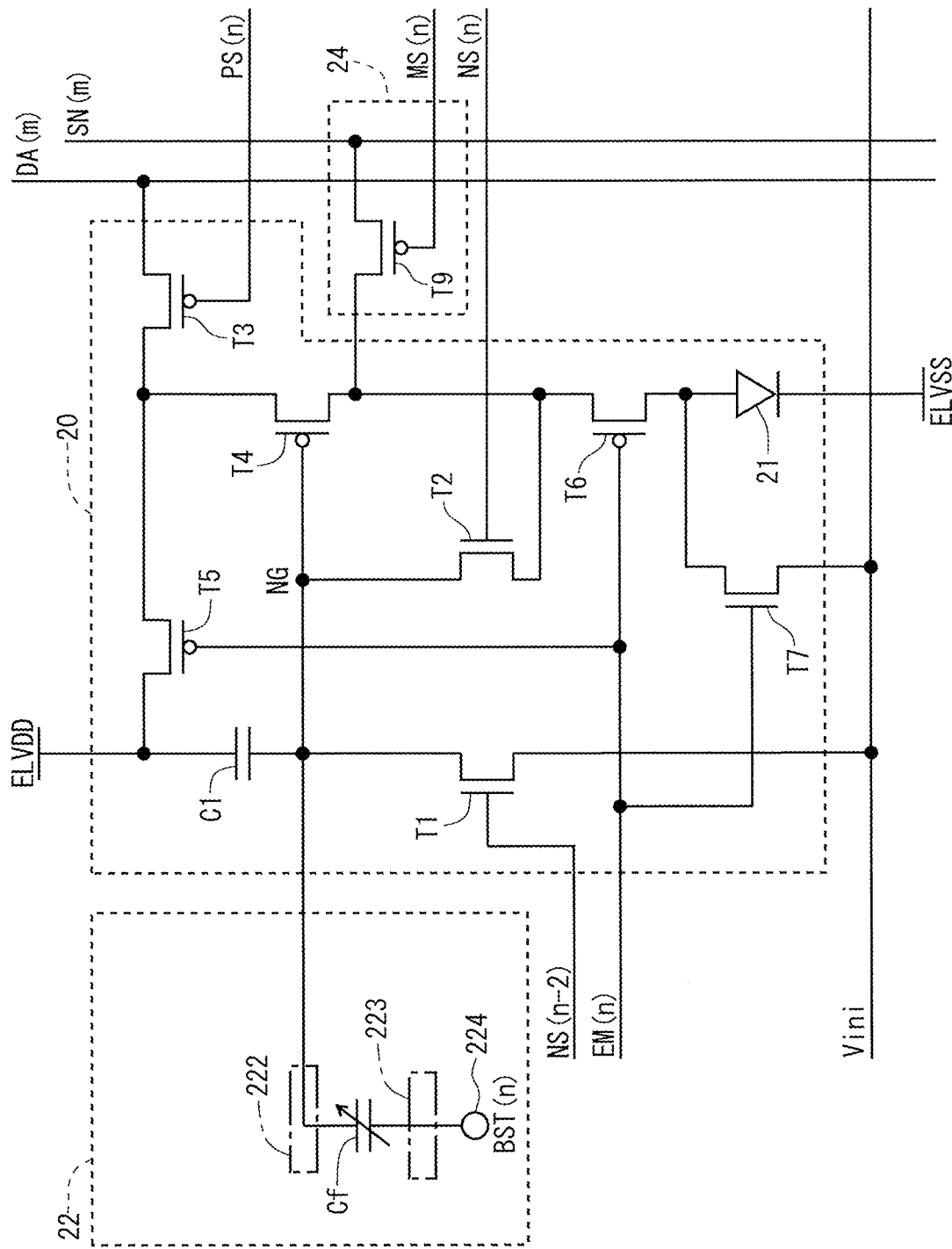
FIG. 20 is a circuit diagram showing a configuration of a pixel circuit with sensing function in an eighth embodiment.

FIG. 20 is a circuit diagram showing a configuration of a pixel circuit with sensing function in the eighth embodiment. As shown in FIG. 20, a sensor circuit 22 includes a first sensor electrode 222 connected to the control node NG; and a second sensor electrode 223 connected to a control signal terminal 224. A control signal BST(n) is provided to the control signal terminal 224. The first sensor electrode 222 and the second sensor electrode 223 are electrodes for forming mutual capacitance Cf (which is given the same reference character as that for self-capacitance, for the sake of convenience). When a finger comes close to the first sensor electrode 222 and the second sensor electrode 223, a part of an electric field between the first sensor electrode 222 and the second sensor electrode 223 is interrupted by the finger, by which capacitance between the first sensor electrode 222 and the second sensor electrode 223 decreases. When a finger does not come close to the first sensor electrode 222 and the second sensor electrode 223 as shown in FIG. 21, mutual capacitance Cf is large. When a finger comes close to the first sensor electrode 222 and the second sensor electrode 223 as shown in FIG. 22, mutual capacitance Cf is small.

By a configuration such as that described above, by a change in the potential of the control signal BST(n) in a state in which mutual capacitance Cf is formed depending on the degree of closeness of the finger to the first sensor electrode 222 and the second sensor electrode 223, charge sharing (re-sharing of charge) is performed between the formed mutual capacitance Cf and the holding capacitor C1.

As above, in the present embodiment, mutual capacitance Cf is detected by the sensor circuit 22.

<8.2 Operation of the Pixel Circuit with Sensing Function>

Figure 23:
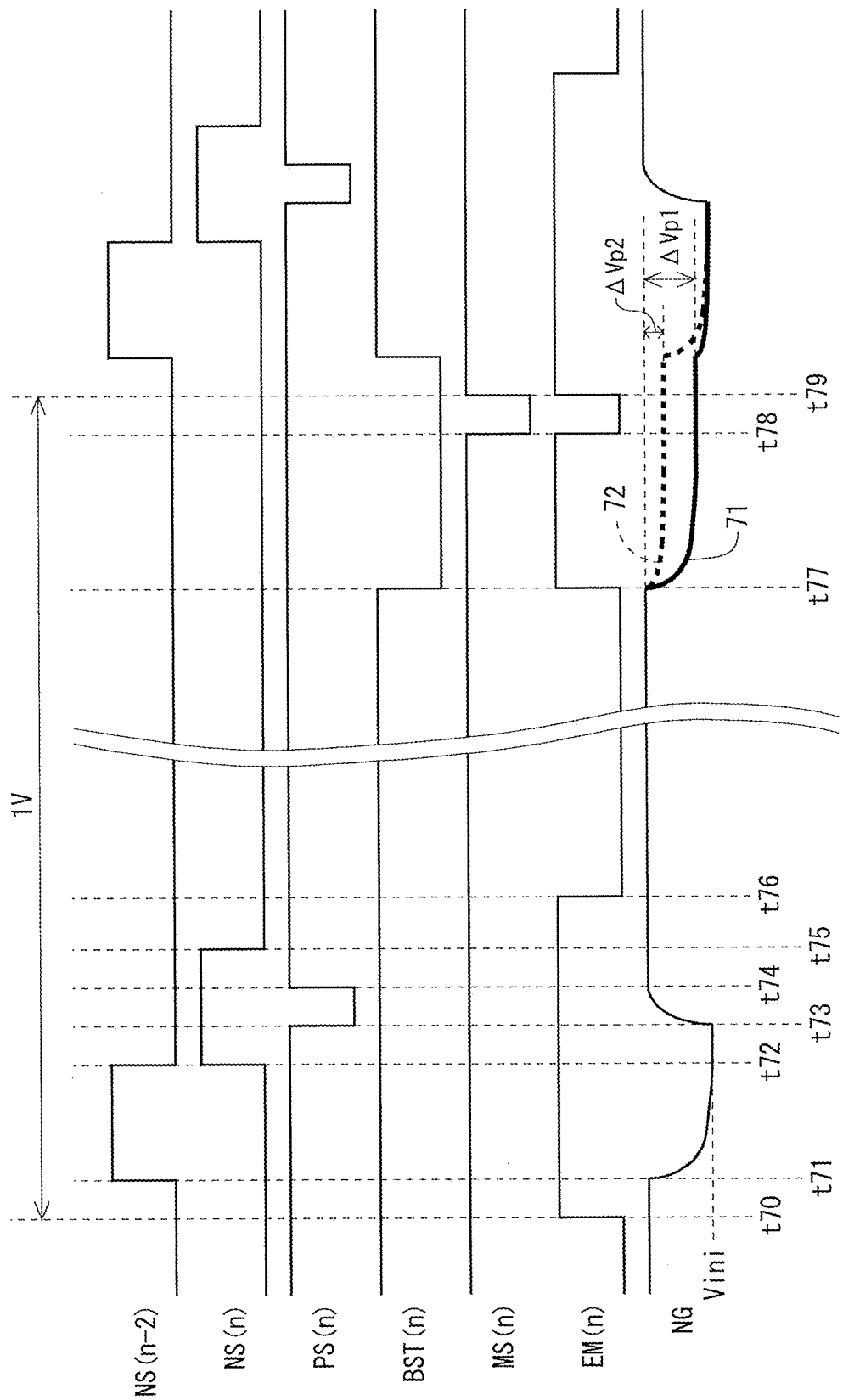
FIG. 23 is a waveform diagram for describing operation of the pixel circuit with sensing function in the eighth embodiment.

With reference to FIG. 23, operation of the pixel circuit with sensing function shown in FIG. 20 will be described. During a period from time t70 to time t71, the same operation as that performed during a period from time t00 to time t01 in the first embodiment (see FIG. 6) is performed.

At time t71, a first scanning signal NS(n−2) changes from low level to high level, by which the first initialization transistor T1 goes into on state. By this, the potential at the control node NG and the potential of the first sensor electrode 222 are initialized based on the initialization potential Vini.

At time t72, the first scanning signal NS(n−2) changes from high level to low level. By this, the first initialization transistor T1 goes into off state. In addition, at time t72, a first scanning signal NS(n) changes from low level to high level, by which the threshold voltage compensation transistor T2 goes into on state. During a period from time t73 to time t75, the same operation as that performed during a period from time t03 to time t05 in the first embodiment (see FIG. 6) is performed. During a period from time t75 to time t77, the same operation as that performed during a period from time t55 to time t57 in the sixth embodiment (see FIG. 17) is performed. Note, however, that unlike the sixth embodiment, during a period from time t74 to time t77, the potential at the control node NG is maintained at the same level.

At time t77, a light-emission control signal EM(n) changes from low level to high level, by which the power supply control transistor T5 and the light-emission control transistor T6 go into off state. By this, supply of a current to the organic EL element 21 is interrupted and the organic EL element 21 goes into turn-off state. In addition, at time t77, the control signal BST(n) changes from high level to low level. As such, after a point in time when the supply of a current to the organic EL element 21 is terminated, for example, the display control circuit 100 changes the potential of the control signal BST(n). By this, charge sharing is performed between mutual capacitance Cf formed at this time and the holding capacitor C1. As a result, the potential at the control node NG changes depending on the magnitude of the mutual capacitance Cf. Meanwhile, the magnitude of the mutual capacitance Cf depends on the degree of closeness of the finger to the first sensor electrode 222 and the second sensor electrode 223. Thus, during a period from time t77 to time t78, the potential at the control node NG changes depending on the degree of closeness of the finger to the first sensor electrode 222 and the second sensor electrode 223. During a period after time t78, the same operation as that performed during a period after time t29 in the third embodiment (see FIG. 11) is performed. Note that charge sharing may be performed between the mutual capacitance Cf and the holding capacitor C1 by the control signal BST(n) changing from low level to high level at time t77.

In an example shown in FIG. 23, at time t78, the potential Vng at the control node NG in a pixel with large mutual capacitance Cf is represented by the following equation (9), and the potential Vng at the control node NG in a pixel with small mutual capacitance Cf is represented by the following equation (10):

$$Vng = Vdata + Vth - \Delta Vp1 - ELVDD \quad (9)$$

$$Vng = Vdata + Vth - \Delta Vp2 - ELVDD \quad (10)$$

As above, the potential at the control node NG at time t78 varies depending on the magnitude of mutual capacitance Cf. Thus, in the present embodiment, too, a fingerprint pattern can be detected based on the value of detection data.

<8.3 Effects>

In the present embodiment, too, a pixel circuit with sensing function that can perform sensing operation and display operation in a simultaneous and parallel manner is implemented using a small number of elements.

9. Variants

Variants will be described below.

<9.1 First Variant>

In recent years, regarding display devices, there has been an increasing demand for a reduction in the power consumption. For techniques that achieve a reduction in power consumption, there is known a technique called "pause driving" in which a pause period during which the operation of writing data signals to pixel circuits is stopped is provided. According to the pause driving, writing of data signals is performed only during one frame period among a plurality of consecutive frame periods, and writing of data signals is not performed during other periods. Here, a period during which writing of data signals is performed is referred to as "write frame period" and a period during which writing of data signals is not performed is referred to as "pause frame period".

Figure 24:
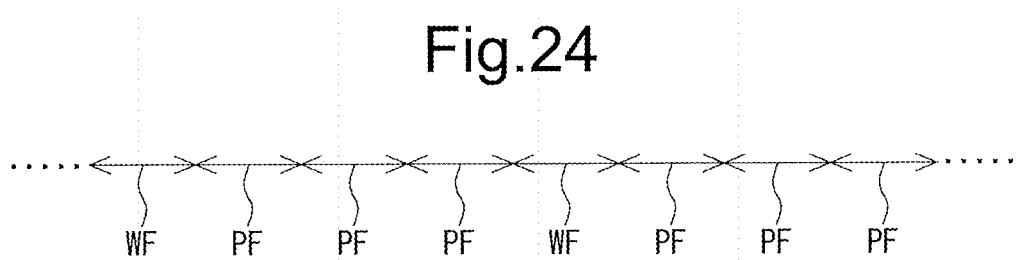
FIG. 24 is a diagram for describing pause driving in a first variant.

In an organic EL display device that adopts pause driving, data signal lines, scanning signal lines, and light-emission control lines are driven such that, for example, one write frame period WF and three pause frame periods PF appear alternately as shown in FIG. 24.

In the present variant, in an organic EL display device that adopts pause driving, a sensing process by the sensor circuit 22 and a sensing result reading process by the read circuit 24 are performed during the above-described pause frame period. More specifically, with P being an integer greater than or equal to 1, a plurality of data signal lines DA, a plurality of scanning signal lines GL, and a plurality of light-emission control lines EM are driven such that a write frame period during which a data signal DA is provided to the control node NG and a P pause frame period during which the data signal DA is not provided to the control node NG appear alternately, and a sensing process and a sensing result reading process are performed during the P pause frame period.

<9.2 Second Variant>

In the above-described embodiments, in each frame period, a sensing result reading process is performed by a read circuit 24 provided for each pixel circuit 20. That is, in all read circuits 24 in the display unit 200, a sensing result reading process is performed in each frame period. However, the configuration is not limited thereto.

In the present variant, with Q being an integer greater than or equal to 2, a sensing result reading process is performed every Qth row in each frame period. Thus, a sensing result reading process for all rows is performed over Q frame periods.

For example, in an odd-numbered frame period, the sensing result reading process is performed by read circuits 24 in odd-numbered rows, and in an even-numbered frame period, the sensing result reading process is performed by read circuits 24 in even-numbered rows. In this case, the sensing result reading process for all rows is performed over two frame periods.

Further, for example, the sensing result reading process is performed every fourth row in each frame period. In this case, the sensing result reading process for a quarter of the whole is performed per frame period, and thus, the sensing result reading process for all rows is performed over four frame periods.

<9.3 Third Variant>

In the above-described embodiments, the plurality of data signal lines DA and the plurality of detection data lines SN are disposed in the display unit 200 so as to intersect the plurality of scanning signal lines GL, etc., and the read circuits 24 are connected to their corresponding detection data lines SN. On the other hand, in the present variant, the detection data lines SN are not disposed in the display unit 200, and the read circuits 24 are connected to their corresponding data signal lines DA. That is, the data signal lines DA are also used as signal lines for reading analog data (analog values) generated depending on results of a sensing process.

Figure 25:
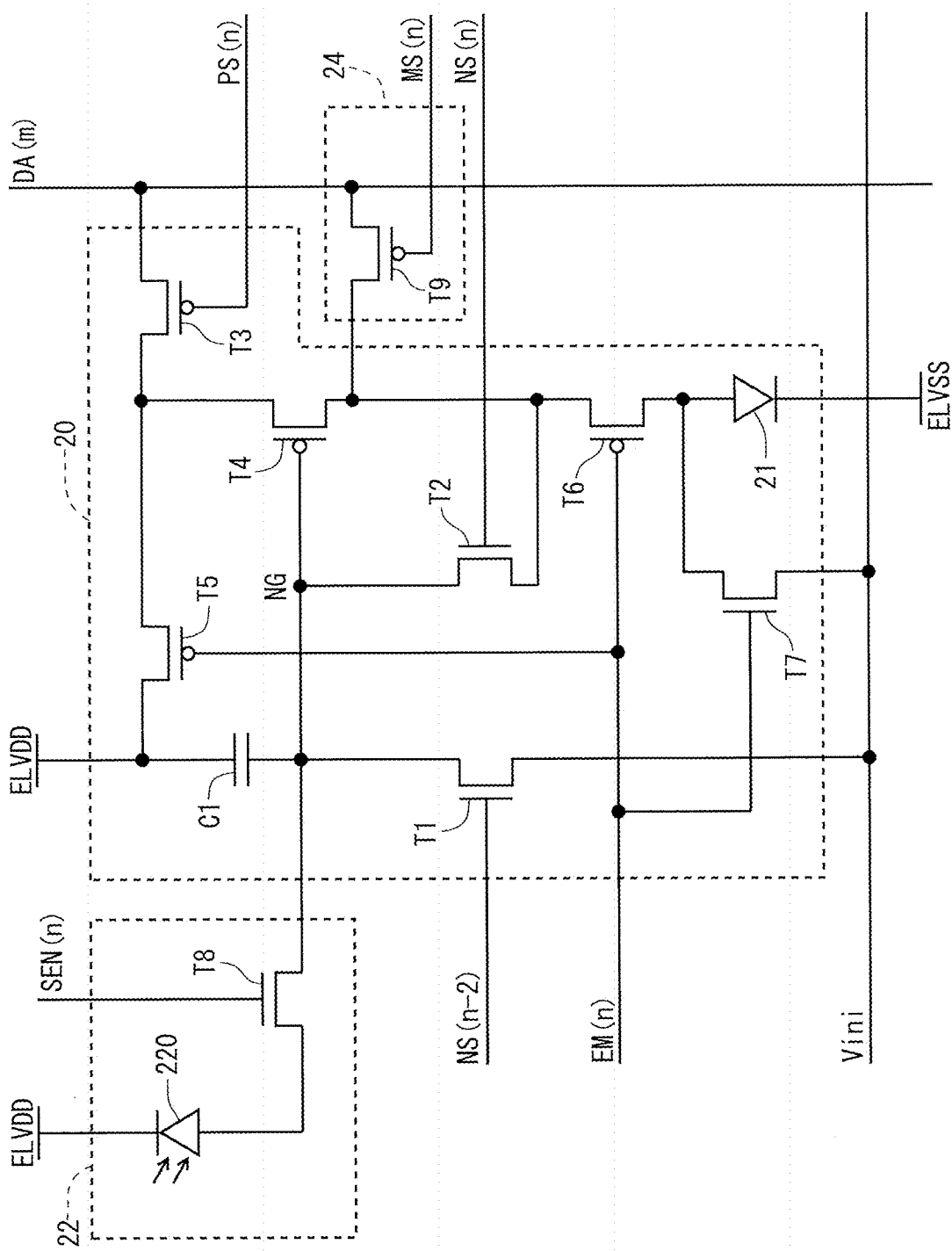
FIG. 25 is a circuit diagram showing a configuration of a pixel circuit with sensing function in a third variant.

FIG. 25 is a circuit diagram showing a configuration of a pixel circuit with sensing function in the present variant. Note that a sensor circuit 22 may adopt any of the configurations in the first to seventh embodiments. A read circuit 24 is constituted by a read transistor T9. The read transistor T9 is connected at its control terminal to a third scanning signal line MS(n), connected at its first conductive terminal to the second conductive terminal of the drive transistor T4, and connected at its second conductive terminal to the data signal line DA(m). The data signal line DA(m) is connected to the data conversion circuit 50 in the source driver 500. That is, the read transistor T9 in each read circuit 24 is connected to the data conversion circuit 50 through one of the plurality of data signal lines DA disposed in the display unit 200. The data conversion circuit 50 performs AD conversion on analog data generated depending on a result of a sensing process.

In a configuration such as that described above, by maintaining the read transistor T9 in on state after ending a sensing process by the sensor circuit 22, a sensing result reading process is performed. Regarding this, the read transistor T9 provided for each pixel circuit 20 is maintained in on state during a period during which the control nodes NG in all pixel circuits 20 in the display unit 200 are not electrically connected to their corresponding data signal lines DA (i.e., a period during which writing of data signals is not performed). Such a driving technique can be easily implemented by performing the sensing result reading process during a pause frame period in a case in which the above-described pause driving is adopted.

<9.4 Fourth Variant>

In the third variant, each read circuit 24 is connected to its corresponding data signal line DA. On the other hand, in the present variant, each read circuit 24 is connected to the initialization power line. That is, the initialization power line is also used as a signal line for reading analog data (analog values) generated depending on results of a sensing process.

Figure 26:
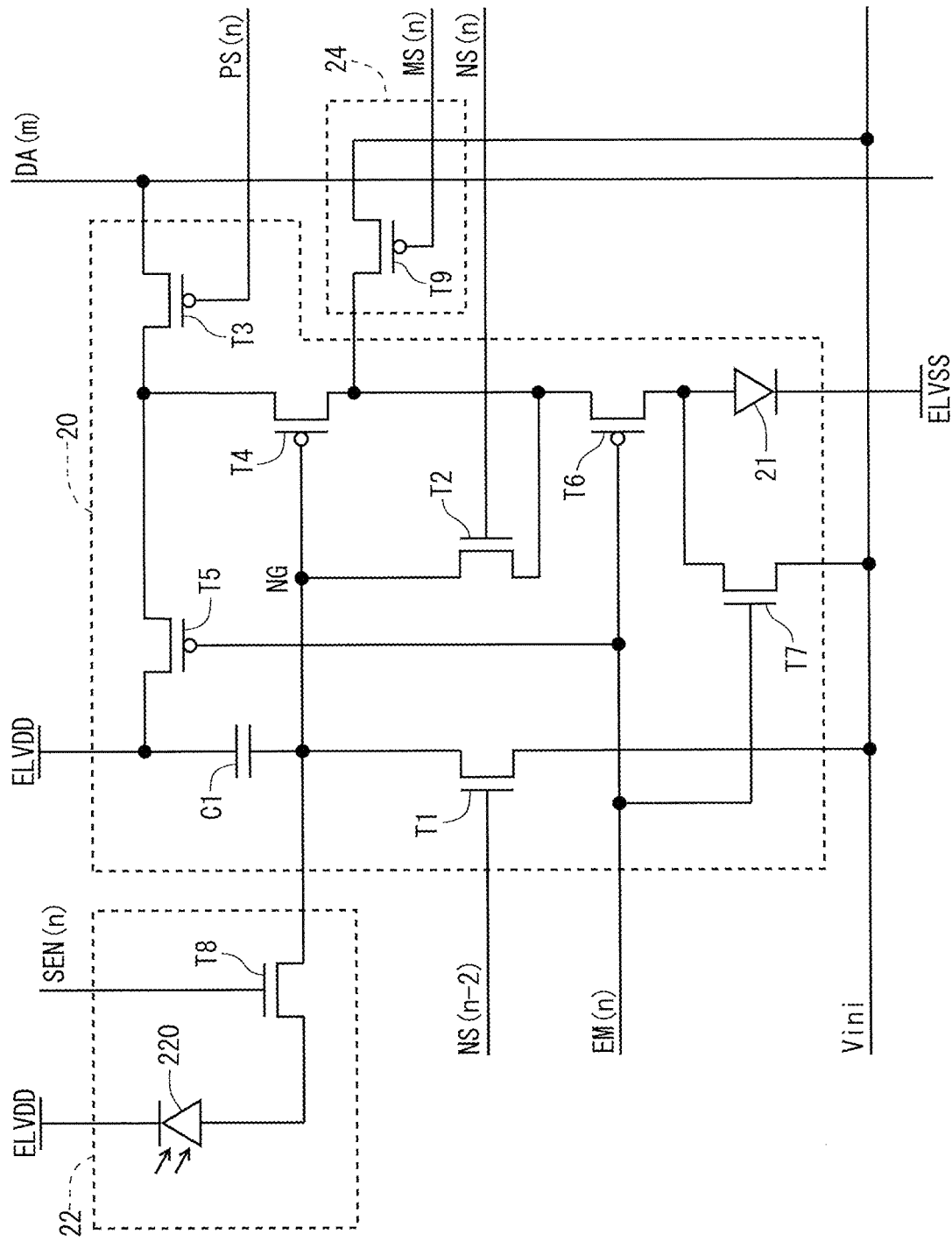
FIG. 26 is a circuit diagram showing a configuration of a pixel circuit with sensing function in a fourth variant.

FIG. 26 is a circuit diagram showing a configuration of a pixel circuit with sensing function in the present variant. Note that a sensor circuit 22 may adopt any of the configurations in the first to seventh embodiments. A read circuit 24 is constituted by a read transistor T9. The read transistor T9 is connected at its control terminal to a third scanning signal line MS(n), connected at its first conductive terminal to the second conductive terminal of the drive transistor T4, and connected at its second conductive terminal to the initialization power line. Analog data generated depending on a result of a sensing process is transmitted by the initialization power line, and a data conversion circuit having the same configuration as that shown in FIG. 5, for example, performs AD conversion on the analog data.

In a configuration such as that described above, by maintaining the read transistor T9 in on state after ending a sensing process by the sensor circuit 22, a sensing result reading process is performed. Regarding this, the read transistor T9 provided for each pixel circuit 20 is maintained in on state during a period during which the first initialization transistors T1 in all pixel circuits 20 in the display unit 200 are maintained in off state (i.e., a period during which initialization of the potentials at the control nodes NG is not performed). Such a driving technique can be easily implemented by performing the sensing result reading process during a pause frame period in a case in which the above-described pause driving is adopted.

<9.5 Fifth Variant>

In the above-described embodiments, it is assumed that the sensing process is performed in the same manner for all frame periods. On the other hand, in the present variant, the sensing process is performed in different states for the first frame of two consecutive frame periods and the second frame thereof, which will be described in detail below. Note that it is assumed that for a configuration of a sensor circuit 22, the configuration in the first embodiment (see FIG. 1) is adopted. Note, however, that the configuration is not limited thereto.

Figure 27:
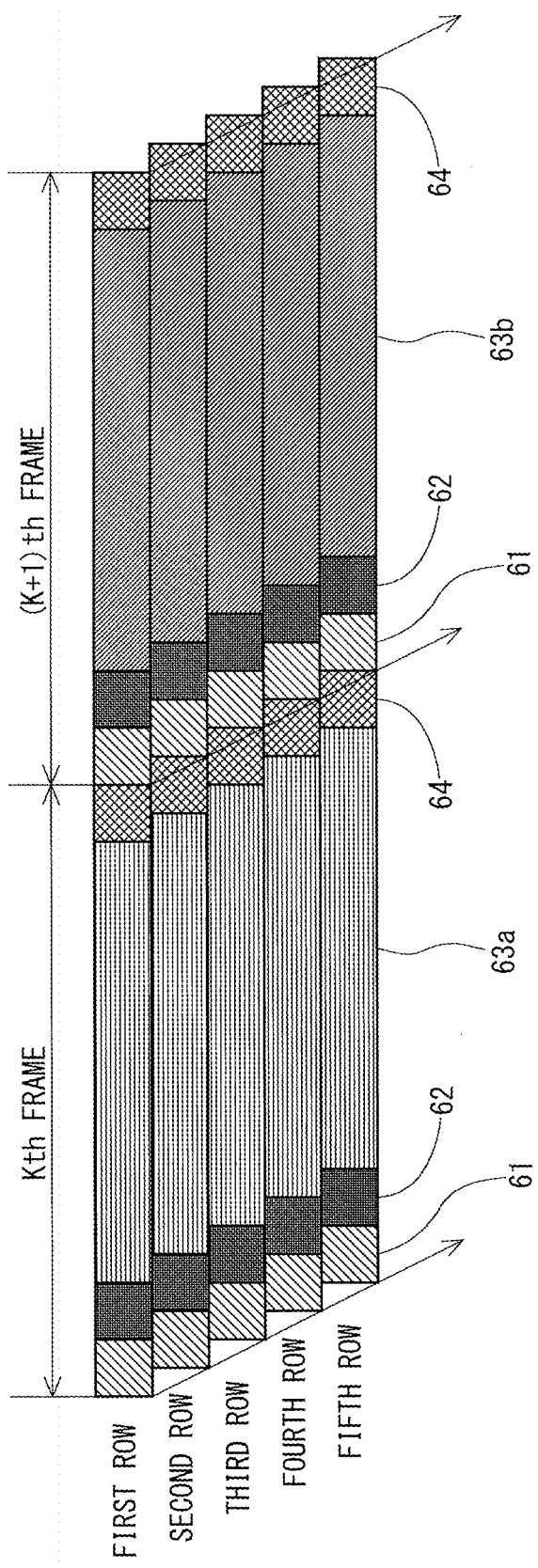
FIG. 27 is a diagram for describing operation performed during two consecutive frame periods in a fifth variant.

In the present variant, regarding two consecutive frame periods, in the first frame, the sensing control transistor T8 is maintained in off state during a period during which supply of a drive current to the organic EL element 21 is performed, and in the second frame, the sensing control transistor T8 is maintained in on state during a period during which supply of a drive current to the organic EL element 21 is performed. Thus, operation performed during the two consecutive frame periods is as shown in FIG. 27. In FIG. 27, a portion given reference character 61 represents a period during which initialization of the circuit is performed, a portion given reference character 62 represents a period during which writing of a data signal DA for image display is performed, a portion given reference character 63a represents a period during which light emission of the organic EL element 21 is performed with the sensing control transistor T8 brought into off state, a portion given reference character 63b represents a period during which light emission of the organic EL element 21 is performed with the sensing control transistor T8 brought into on state, and a portion given reference character 64 represents a period during which reading of a current depending on the amount of received light is performed.

Figure 28:
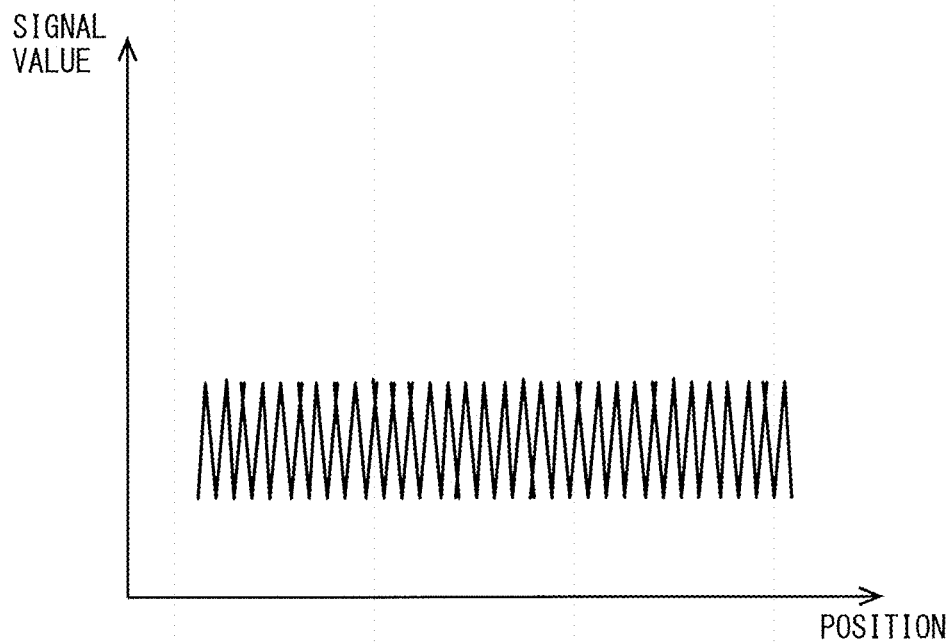
FIG. 28 is a diagram showing detection data obtained in a Kth frame in the fifth variant.
Figure 29:
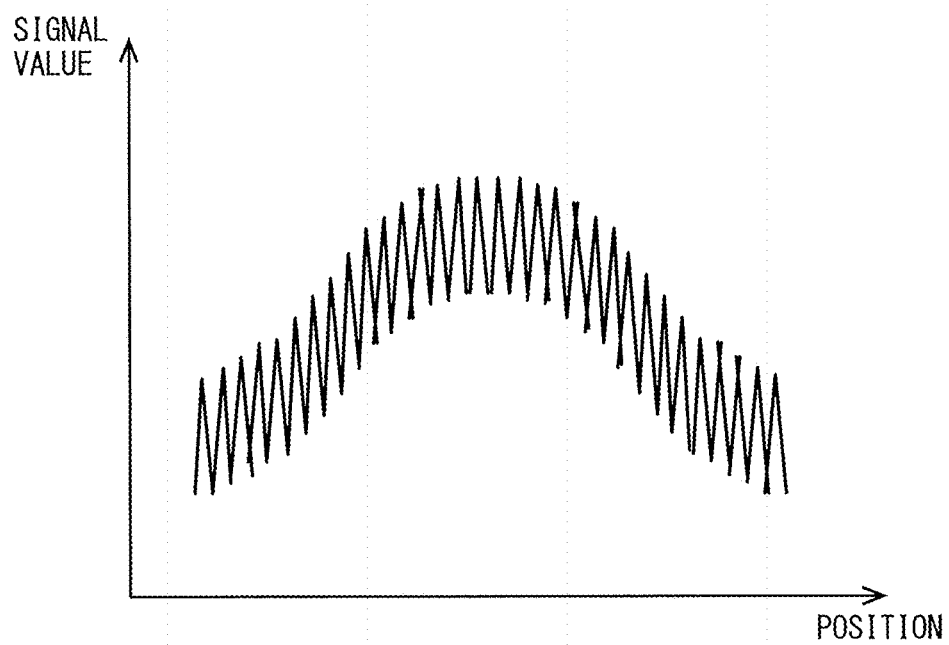
FIG. 29 is a diagram showing detection data obtained in a (K+1)th frame in the fifth variant.
Figure 30:
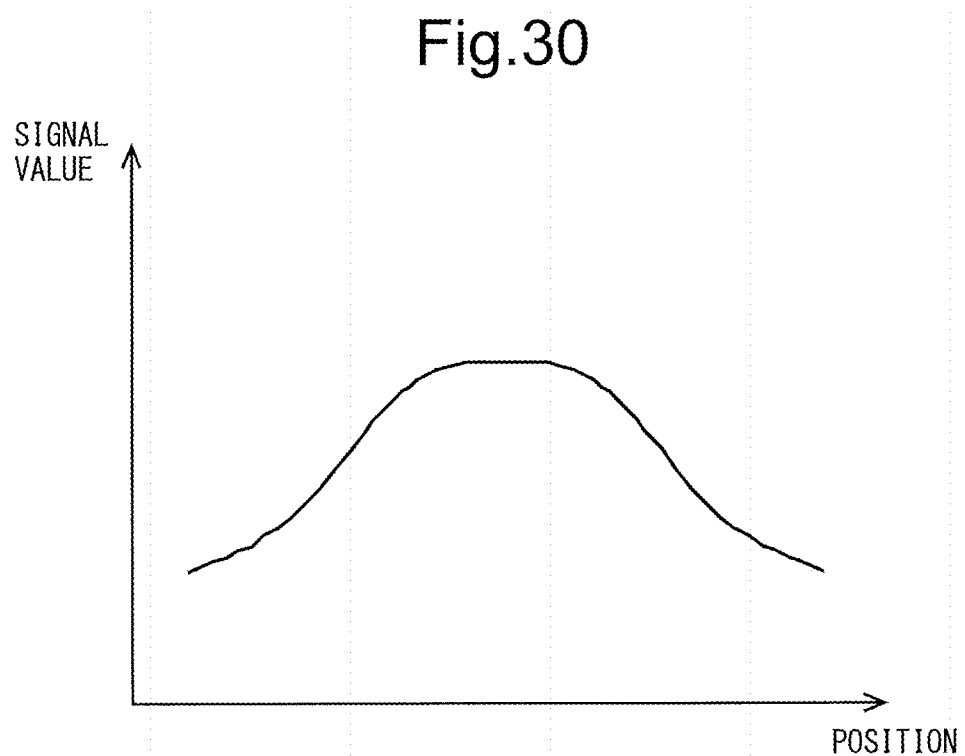
FIG. 30 is a diagram showing differential data in the fifth variant.

In the organic EL display device, various types of noise occur, such as noise caused by variations in the light-emission efficiency of the organic EL element 21, noise caused by variations in the characteristics of transistors, and electrical noise. During the period given reference character 63a in FIG. 27, charge resulting from such noise is stored in the holding capacitor C1. Therefore, detection data obtained in the Kth frame is such as that shown in FIG. 28, for example. The detection data shown in FIG. 28 includes only noise data. On the other hand, during the period given reference character 63b in FIG. 27, in addition to charge resulting from noise, charge resulting from flowing of a photocurrent depending on the intensity of outside light to the control node NG is stored in the holding capacitor C1. Therefore, detection data obtained in the (K+1)th frame is such as that shown in FIG. 29, for example. The detection data shown in FIG. 29 includes noise data and data for fingerprint detection. Differential data between the detection data shown in FIG. 29 and the detection data shown in FIG. 28 is such as that shown in FIG. 30. The differential data shown in FIG. 30 includes only the data for fingerprint detection.

As above, by obtaining differential data between detection data obtained in the first frame of two consecutive frame periods and detection data obtained in the second frame thereof, highly accurate sensing results in which the influence of noise is removed can be obtained. As such, according to the present variant, it becomes possible to highly accurately detect a fingerprint pattern.

Note that to implement this, in the present variant, a difference detection circuit is provided that determines a difference between a detection value obtained by performing the sensing process during a first period which is one of two consecutive frame periods and a detection value obtained by performing the sensing process during a second period which is another one of the two consecutive frame periods. Then, in the first period, the read transistor T9 is maintained in on state during a predetermined period after performing supply of a drive current to the organic EL element 21 with the sensing control transistor T8 maintained in off state, and in the second period, the read transistor T9 is maintained in on state during a predetermined period after performing supply of a drive current to the organic EL element 21 with the sensing control transistor T8 maintained in on state.

<9.6 Sixth Variant>

In the above-described embodiments, the sensor circuit 22 and the read circuit 24 are provided for each of all pixel circuits 20. That is, pixel circuits with sensing function are provided in the entire display unit 200. However, the configuration is not limited thereto. The sensor circuit 22 and the read circuit 24 may be provided for each of at least some of the plurality of pixel circuits 20 (i×j pixel circuits 20).

10. Others

Although description is made of an example in which the organic EL element 21 is used as a display element in the above-described embodiments and variants, the configuration is not limited thereto. The above-described content of disclosure can also be applied to a case in which a quantum dot LED (QLED) or a microLED (µLED) is used as a display element, as long as the display element is driven by a current.

DESCRIPTION OF REFERENCE CHARACTERS

20: PIXEL CIRCUIT
21: ORGANIC EL ELEMENT
22: SENSOR CIRCUIT
24: READ CIRCUIT
50: DATA CONVERSION CIRCUIT

100: DISPLAY CONTROL CIRCUIT
200: DISPLAY UNIT
220: PHOTODIODE
221: SENSOR ELECTRODE
222: FIRST SENSOR ELECTRODE
223: SECOND SENSOR ELECTRODE
300: GATE DRIVER (SCANNING SIGNAL LINE DRIVE CIRCUIT)
350: SENSING DRIVER (SENSING CONTROL LINE DRIVE CIRCUIT)
400: EMISSION DRIVER (LIGHT-EMISSION CONTROL LINE DRIVE CIRCUIT)
500: SOURCE DRIVER (DATA SIGNAL LINE DRIVE CIRCUIT)
GL: SCANNING SIGNAL, SCANNING SIGNAL LINE
NS: FIRST SCANNING SIGNAL, FIRST SCANNING SIGNAL LINE
PS: SECOND SCANNING SIGNAL, SECOND SCANNING SIGNAL LINE
MS: THIRD SCANNING SIGNAL, THIRD SCANNING SIGNAL LINE
SEN: SENSING CONTROL SIGNAL, SENSING CONTROL LINE
EM: LIGHT-EMISSION CONTROL SIGNAL, LIGHT-EMISSION CONTROL LINE
DA: DATA SIGNAL, DATA SIGNAL LINE
SN: DETECTION DATA, DETECTION DATA LINE
NG: CONTROL NODE
T1: FIRST INITIALIZATION TRANSISTOR
T2: THRESHOLD VOLTAGE COMPENSATION TRANSISTOR
T3: WRITE CONTROL TRANSISTOR
T4: DRIVE TRANSISTOR
T5: POWER SUPPLY CONTROL TRANSISTOR
T6: LIGHT-EMISSION CONTROL TRANSISTOR
T7: SECOND INITIALIZATION TRANSISTOR
T8: SENSING CONTROL TRANSISTOR
T9: READ TRANSISTOR
C1: HOLDING CAPACITOR
C2: SENSING CAPACITOR

The invention claimed is:

1. A display device that uses a display element driven by a current, the display device comprising:
a plurality of data signal lines each configured to transmit a data signal;
a plurality of scanning signal lines that intersect the plurality of data signal lines;
a plurality of light-emission control lines that intersect the plurality of data signal lines;
a plurality of sensing control lines that intersect the plurality of data signal lines;
a plurality of pixel circuits each including the display element and provided so as to correspond to one of the plurality of data signal lines, at least one of the plurality of scanning signal lines, and one of the plurality of light-emission control lines;
a first power line to which a first power supply potential is provided;
a second power line to which a second power supply potential is provided;
an initialization power line to which an initialization potential is provided; and
a data conversion circuit including an AD converter, wherein
each of the plurality of pixel circuits includes:
the display element provided between the first power line and the second power line and having a first terminal on a first power line side; and a second terminal on a second power line side;
a control node;
a drive transistor provided in series with the display element and having a control terminal connected to the control node; a first conductive terminal on a first power line side; and a second conductive terminal on a second power line side;
a first initialization transistor having a control terminal; a first conductive terminal connected to the control node; and a second conductive terminal connected to the initialization power line; and
a holding capacitor having one terminal connected to the control node, for each of at least some of the plurality of pixel circuits, there are provided:
a sensor circuit connected to the control node, including three or less circuit elements, and configured to perform a sensing process; and
a read transistor having a control terminal; a first conductive terminal connected to the second conductive terminal of the drive transistor; and a second conductive terminal connected to the data conversion circuit,
the sensing process is performed during a period during which a drive current is supplied to the display element depending on a potential at the control node,
a sensing result reading process in which an analog value obtained based on a result of the sensing process is read to the data conversion circuit is performed by maintaining the read transistor in on state during a predetermined period after ending the sensing process,
the sensor circuit includes:
a photodiode to which a reverse-bias voltage is applied, the photodiode having an anode terminal and a cathode terminal; and
a sensing control transistor having a control terminal connected to one of the plurality of sensing control lines, a first conductive terminal connected to the photodiode, and a second conductive terminal connected to the control node, and for each of the at least some of the plurality of pixel circuits, one frame period includes:
an initialization period during which the first initialization transistor and the sensing control transistor are maintained in on state in a state where supply of a drive current to the display element is stopped;
a data write period during which the data signal is provided to the control node with the first initialization transistor and the sensing control transistor maintained in off state in a state where supply of a drive current to the display element is stopped, the data write period being a period after the initialization period;
a display period during which a drive current is supplied to the display element with the first initialization transistor maintained in off state and the sensing control transistor maintained in on state, the display period being a period after the data write period; and
a sensing result read period during which the first initialization transistor and the sensing control transistor are maintained in off state and the read transistor is maintained in on state, the sensing result read period being a period after the display period.

2. The display device according to claim 1, wherein the first power supply potential is higher than the initialization potential, the anode terminal of the photodiode is connected to the first conductive terminal of the sensing control transistor, and the cathode terminal of the photodiode is connected to the first power line.

3. The display device according to claim 1, wherein the cathode terminal of the photodiode is connected to the first conductive terminal of the sensing control transistor, and a potential lower than the second power supply potential is provided to the anode terminal of the photodiode.

4. The display device according to claim 1, wherein the second conductive terminal of the read transistor is connected to the data conversion circuit through one of the plurality of data signal lines, and the read transistor provided for each of the plurality of pixel circuits is maintained in on state during a period, as the predetermined period, during which the control nodes in all of the plurality of pixel circuits are not electrically connected to the corresponding data signal lines.

5. The display device according to claim 1, wherein with P being an integer greater than or equal to 1, the plurality of data signal lines, the plurality of scanning signal lines, and the plurality of light-emission control lines are driven such that a write frame period during which the data signal is provided to the control node and a P pause frame period during which the data signal is not provided to the control node appear alternately, and the sensing process and the sensing result reading process are performed in the P pause frame period.

6. The display device according to claim 1, wherein with Q being an integer greater than or equal to 2, the sensing result reading process is performed every Qth row during each frame period, by which the sensing result reading process for all rows is performed over Q frame periods.

7. A display device that uses a display element driven by a current, the display device comprising:
a plurality of data signal lines each configured to transmit a data signal;
a plurality of scanning signal lines that intersect the plurality of data signal lines;
a plurality of light-emission control lines that intersect the plurality of data signal lines;
a plurality of sensing control lines that intersect the plurality of data signal lines;
a plurality of pixel circuits each including the display element and provided so as to correspond to one of the plurality of data signal lines, at least one of the plurality of scanning signal lines, and one of the plurality of light-emission control lines;
a first power line to which a first power supply potential is provided;
a second power line to which a second power supply potential is provided;
an initialization power line to which an initialization potential is provided; and
a data conversion circuit including an AD converter, wherein
each of the plurality of pixel circuits includes:
the display element provided between the first power line and the second power line and having a first terminal on a first power line side, and a second terminal on a second power line side;
a control node;
a drive transistor provided in series with the display element and having a control terminal connected to the control node, a first conductive terminal on a first power line side, and a second conductive terminal on a second power line side;
a first initialization transistor having a control terminal, a first conductive terminal connected to the control node, and a second conductive terminal connected to the initialization power line; and
a holding capacitor having one terminal connected to the control node,
for each of at least some of the plurality of pixel circuits, there are provided;
a sensor circuit connected to the control node, including three or less circuit elements, and configured to perform a sensing process; and
a read transistor having a control terminal, a first conductive terminal connected to the second conductive terminal of the drive transistor, and a second conductive terminal connected to the data conversion circuit,
the sensing process is performed during a period during which a drive current is supplied to the display element depending on a potential at the control node,
a sensing result reading process in which an analog value obtained based on a result of the sensing process is read to the data conversion circuit is performed by maintaining the read transistor in on state during a predetermined period after ending the sensing process,
the sensor circuit includes:
a photodiode to which a reverse-bias voltage is applied, the photodiode having an anode terminal and a cathode terminal;
a sensing control transistor having a control terminal connected to one of the plurality of sensing control lines; a first conductive terminal connected to the photodiode; and a second conductive terminal connected to the control node; and
a sensing capacitor having one terminal connected to the first conductive terminal of the sensing control transistor, and
for each of the at least some of the plurality of pixel circuits, one frame period includes:
an initialization period during which the first initialization transistor and the sensing control transistor are maintained in on state in a state where supply of a drive current to the display element is stopped;
a data write period during which the data signal is provided to the control node with the first initialization transistor and the sensing control transistor maintained in off state in a state where supply of a drive current to the display element is stopped, the data write period being a period after the initialization period;
a display period during which a drive current is supplied to the display element with the first initialization transistor and the sensing control transistor maintained in off state, the display period being a period after the data write period;
a charge sharing period during which the first initialization transistor is maintained in off state and the sensing control transistor is maintained in on state the charge sharing period being a period after the display period; and
a sensing result read period during which the first initialization transistor is maintained in off state and the read transistor is maintained in on state, the sensing result read period being a period after the charge sharing period.

8. The display device according to claim 7, wherein
the first power supply potential is higher than the initialization potential,
the anode terminal of the photodiode is connected to the first conductive terminal of the sensing control transistor, and
the cathode terminal of the photodiode is connected to the first power line.

9. The display device according to claim 7, wherein
the second power supply potential is higher than the initialization potential,
the anode terminal of the photodiode is connected to the first conductive terminal of the sensing control transistor, and
the cathode terminal of the photodiode is connected to the second power line.

10. The display device according to claim 9, wherein upon starting supply of a drive current to the display element, a potential provided to another terminal of the sensing capacitor is reduced.

11. A display device that uses a display element driven by a current, the display device comprising:
a plurality of data signal lines each configured to transmit a data signal;
a plurality of scanning signal lines that intersect the plurality of data signal lines;
a plurality of light-emission control lines that intersect the plurality of data signal lines;
a plurality of pixel circuits each including the display element and provided so as to correspond to one of the plurality of data signal lines, at least one of the plurality of scanning signal lines, and one of the plurality of light-emission control lines;
a first power line to which a first power supply potential is provided;
a second power line to which a second power supply potential is provided;
an initialization power line to which an initialization potential is provided; and
a data conversion circuit including an AD converter, wherein
each of the plurality of pixel circuits includes:
the display element provided between the first power line and the second power line and having a first terminal on a first power line side, and a second terminal on a second power line side;
a control node;
a drive transistor provided in series with the display element and having a control terminal connected to the control node, a first conductive terminal on a first power line side, and a second conductive terminal on a second power line side;
a first initialization transistor having a control terminal, a first conductive terminal connected to the control node, and a second conductive terminal connected to the initialization power line; and
a holding capacitor having one terminal connected to the control node, for each of at least some of the plurality of pixel circuits, there are provided:
a sensor circuit connected to the control node, including three or less circuit elements, and configured to perform a sensing process; and
a read transistor having a control terminal, a first conductive terminal connected to the second conductive terminal of the drive transistor, and a second conductive terminal connected to the data conversion circuit,
the sensing process is performed during a period during which a drive current is supplied to the display element depending on a potential at the control node,
a sensing result reading process in which an analog value obtained based on a result of the sensing process is read to the data conversion circuit is performed by maintaining the read transistor in on state during a predetermined period after ending the sensing process,
the second conductive terminal of the read transistor is connected to the initialization power line, and
the read transistor provided for each of the plurality of pixel circuits is maintained in on state during a period, as the predetermined period, during which the first initialization transistor is maintained in off state in all of the plurality of pixel circuits.

12. The display device according to claim 11, further comprising a plurality of sensing control lines that intersect the plurality of data signal lines, wherein
the sensor circuit includes:
a photodiode to which a reverse-bias voltage is applied, the photodiode having an anode terminal and a cathode terminal; and
a sensing control transistor having a control terminal connected to one of the plurality of sensing control lines, a first conductive terminal connected to the photodiode, and a second conductive terminal connected to the control node.

13. The display device according to claim 11, further comprising a plurality of sensing control lines that intersect the plurality of data signal lines, wherein
the sensor circuit includes:
a photodiode to which a reverse-bias voltage is applied, the photodiode having an anode terminal and a cathode terminal;
a sensing control transistor having a control terminal connected to one of the plurality of sensing control lines, a first conductive terminal connected to the photodiode, and a second conductive terminal connected to the control node; and
a sensing capacitor having one terminal connected to the first conductive terminal of the sensing control transistor.

14. The display device according to claim 11, further comprising a plurality of sensing control lines that intersect the plurality of data signal lines, wherein
the sensor circuit includes:
a sensor electrode configured to form self-capacitance between an operator's finger and the sensor electrode; and
a sensing control transistor having a control terminal connected to one of the plurality of sensing control lines, a first conductive terminal connected to the sensor electrode, and a second conductive terminal connected to the control node.

15. The display device according to claim 11, wherein
the sensor circuit includes a first sensor electrode and a second sensor electrode, the first sensor electrode and the second sensor electrode being two electrodes for forming mutual capacitance,
the first sensor electrode is connected to the control node,
a control signal is provided to the second sensor electrode, and a potential of the control signal is changed after a point in time when the supply of a drive current to the display element is terminated.

16. The display device according to claim 11, wherein
the sensor circuit includes only a photodiode to which a reverse-bias voltage is applied, the photodiode having an anode terminal and a cathode terminal, and
one of the anode terminal and the cathode terminal is connected to the control node.

17. The display device according to claim 11, comprising:
a plurality of sensing control lines that intersect the plurality of data signal lines; and
a difference detection circuit configured to determine a difference between a detection value obtained by performing the sensing process during a first period and a detection value obtained by performing the sensing process during a second period, the first period being one of two consecutive frame periods and the second period being another one of the two consecutive frame periods, wherein
the sensor circuit includes:
a photodiode to which a reverse-bias voltage is applied, the photodiode having an anode terminal and a cathode terminal; and
a sensing control transistor having a control terminal connected to one of the plurality of sensing control lines, a first conductive terminal connected to the photodiode, and a second conductive terminal connected to the control node,
in the first period, the read transistor is maintained in on state during the predetermined period after performing supply of a drive current to the display element, with the sensing control transistor maintained in off state, and
in the second period, the read transistor is maintained in on state during the predetermined period after performing supply of a drive current to the display element, with the sensing control transistor maintained in on state.

* * * * *